United States Patent
Kenzaki et al.

(10) Patent No.: US 8,111,048 B2
(45) Date of Patent: Feb. 7, 2012

(54) DOUBLE FED SYNCHRONOUS GENERATOR MOTOR

(75) Inventors: Akira Kenzaki, Hyogo (JP); Takeshi Machino, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 499 days.

(21) Appl. No.: 12/334,630

(22) Filed: Dec. 15, 2008

(65) Prior Publication Data

US 2009/0302607 A1 Dec. 10, 2009

(30) Foreign Application Priority Data

Jun. 4, 2008 (JP) .................. 2008-146930

(51) Int. Cl.
*H02P 9/00* (2006.01)
(52) U.S. Cl. ...................... 322/29
(58) Field of Classification Search .............. 322/29, 322/39; 290/55, 40 C, 43
See application file for complete search history.

(56) References Cited

U.S. PATENT DOCUMENTS

| | | | |
|---|---|---|---|
| 4,743,826 A | 5/1988 | Bando et al. | |
| 5,561,358 A | 10/1996 | Kuwabara | |
| 7,253,537 B2 * | 8/2007 | Weng et al. | 290/44 |
| 7,256,508 B2 * | 8/2007 | Altemark et al. | 290/44 |

FOREIGN PATENT DOCUMENTS

| | | |
|---|---|---|
| EP | 0 243 937 A1 | 11/1987 |
| EP | 0 303 170 A2 | 2/1989 |
| EP | 0 313 096 A1 | 4/1989 |
| JP | 61-240829 A | 10/1986 |

OTHER PUBLICATIONS

European Search Report issued in corresponding European Patent Application No. 09 15 1663.3 on Jul. 13, 2011.

* cited by examiner

*Primary Examiner* — Nguyen N Hanh
(74) *Attorney, Agent, or Firm* — Buchanan Ingersoll & Rooney PC

(57) ABSTRACT

A double fed synchronous generator motor which is coupled to a reversible pump-turbine and operated while switched to a power generating operation mode or a pumping operation mode, is equipped with a controller for controlling the double fed synchronous generator motor so that power output from the double fed synchronous generator motor is coincident with an instruction value and the rotating speed is set between upper and lower limit values of the rotating speed by changing exciting current. In the power generating operation mode, the lower limit value of the rotating speed is varied by active power output from the double fed synchronous generator motor, and when the active power is small, the lower limit value of the rotating speed is set to a smaller value than that when the active power is large.

9 Claims, 20 Drawing Sheets

DOUBLE FED SYNCHRONOUS GENERATOR MOTOR

BACKGROUND OF THE INVENTION

1. Field of the Invention

The present invention relates to a double fed synchronous generator motor which is connected to an electric power system at a stator side and to a frequency-variable power converter at a rotor side, coupled to a reversible pump-turbine and operated while switched to an electric power generating operation mode or a pump-up operation mode.

2. Description of the Related Art

A double fed synchronous generator motor can be generally operated at fixed upper and lower speeds with the synchronous speed at the center, that is, within the range of a variable speed width. Furthermore, as disclosed in JP-A-61-240829 (page 4, FIGS. 2 to 5), optimum variable speed widths are set to a pumping operation and a power generating operation respectively in a variable speed pumped-storage power generating system using a double fed synchronous generator motor. The variable speed width is fixed to a value set for any power generation output or pumping input, and it is practically applied as a fixed value at all times irrespective of the operation state.

It is generally known that the input in the pumping operation of a reversible pump-turbine varies hardly even when the guide vane opening is changed, and it varies substantially in proportion to 2.5 to 3 powers of the rotating speed. A variable speed pumped-storage power generating system is introduced to implement AFC operation even during pumping operation, and the variable speed width of the double fed synchronous generator motor applied to the variable speed pumped-storage power generating system is determined by the AFC capacity in the pumping operation.

For example, a pump input of 300 MW is required at the synchronous speed, a reversible pump-turbine whose input is proportional to 3 powers of the rotating speed is assumed, and if the variable speed width is set to the range of ±10% of the synchronous speed with the synchronous speed set at the center of the range, the AFC capacity of $300\,MW \times (1.1^3 - 0.9^3)$ $= 399.3\,MW - 218.7\,MW = 180.6\,MW$ can be secured.

In order to operate the double fed synchronous generator motor in the range of ±10% of the rated speed, it is necessary for the variable frequency power converter to apply a voltage having a frequency in the range of ±10% of the rated frequency (called as slip frequency) to the winding of the rotor of the double fed synchronous generator motor. In the case of a 50 Hz system, an exciting voltage of ±5 Hz frequency must be output.

Accordingly, the required maximum output voltage of the variable frequency power converter corresponds to the voltage obtained by multiplying the exciting current required to perform the pumping operation of 399.3 MW by the impedance of the winding of the rotor. This is because the magnitude of the exciting current is maximum for the input of 399.3 MW and the impedance of the rotor is substantially proportional to the applied frequency, so that the maximum voltage is obtained at +5 Hz.

Since the rotating speed in the operation of the minimum pump input of 218.7 MW is equal to −5%, the exciting frequency of the rotor is also the negative maximum value, and the impedance of the winding of the rotor is also maximum. However, the exciting current is small and thus there is no problem if the output voltage of the variable frequency power converter is small. Accordingly, it does not become a factor for determining the required maximum output voltage of the exciting device.

In general, the rotating speed of the double fed synchronous generator motor is operated within the range of a variable speed width adopted to secure a required AFC capacity. That is, the variable speed width is fixed to the value of a variable speed width in which the upper and lower limit values of the rotating speed with respect to the synchronous speed are fixed in the overall area of the water turbine output irrespective of the water turbine output of the reversible pump-turbine.

Accordingly, it is known from the performance characteristic of the reversible pump-turbine that the water turbine efficiency of the reversible pump-turbine is higher as the rotating speed is lower, and thus it is preferable to operate the reversible pump-turbine at a rotating speed which is as low as possible. However, the rotating speed is restricted by the lower limit of the variable speed width, and thus in many cases the reversible pump-turbine is operated while the speed is fixed to the lower limit speed of the variable speed width.

On the other hand, when the electric output of the water turbine output of the reversible pump-turbine, that is, the double fed synchronous generator motor is low, the magnitude of the exciting current may be small, and thus there is a margin in the exciting voltage. Therefore, the exciting voltage can be increased by further lowering the rotating speed. That is, when the output is low, the rotating speed can be further reduced.

From this viewpoint, there is a merit that if the operation is carried out while the lower limit of the variable speed width is reduced when the output in the power generating operation is small, the operation could be carried out with a high water turbine efficiency. In the pumping operation, the lower limit of the variable speed width can be likewise reduced in the case of a low pumping input operation, that is, when the rotating speed is small, and thus the operation can be performed with a smaller pumping input. In other words, there is a merit that the AFC capacity can be further increased.

Accordingly, the operation at a fixed variable speed width over the whole area of the water turbine output of the reversible pump-turbine means that an opportunity of enhancing the efficiency at a low area of the water turbine output is missed and also an opportunity of increasing the AFC amount is missed in the case of the pumping operation.

In other words, there is a challenge of enhancing the power generation efficiency in the low rotating speed area and the pumping AFC amount in the water turbine operation or in the pumping operation in the variable speed pumped-storage power generating system based on the double fed synchronous generator motor.

SUMMARY OF THE INVENTION

The present invention has been implemented in view of the foregoing challenge, and has an object to provide a double fed synchronous generator motor which is used for a variable speed pumped-storage power generating system and in which a variable speed width in a low rotating speed area in a power generating operation is increased, whereby the operation can be performed with an enhanced efficiency.

In order to attain the above object, according to an aspect of the present invention, a double fed synchronous generator motor which is coupled to a reversible pump-turbine and operated while switched to a power generating operation mode or a pumping operation mode is equipped with a controller for controlling the double fed synchronous generator motor so that power output from the double fed synchronous generator motor is coincident with an instruction value and the rotating speed is set between upper and lower limit values of the rotating speed by changing exciting current. In the power generating operation mode, the lower limit value of the rotating speed is varied by active power output from the double fed synchronous generator motor, and when the active power is small, the lower limit value of the rotating speed is set to a smaller value than that when the active power is large.

According to an aspect of the present invention, the double fed synchronous generator motor is coupled to a reversible pump-turbine and operated while switched to a power generating operation mode or a pumping operation mode, and it is equipped with a controller for controlling the double fed synchronous generator motor so that power output from the double fed synchronous generator motor is coincident with an instruction value and the rotating speed is set between upper and lower limit values of the rotating speed by changing exciting current. In the power generating operation mode, the lower limit value of the rotating speed is varied by active power output from the double fed synchronous generator motor, and when the active power is small, the lower limit value of the rotating speed is set to a smaller value than that when the active power is large. Accordingly, the double fed synchronous generator motor can be operated with a higher efficiency irrespective of the active power output from the double fed synchronous generator motor as compared with the case where the lower limit value of the rotating speed is fixed.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described hereunder with reference to the accompanying drawings.

First Embodiment

A first embodiment according to the present invention will be described with reference to FIG. 1.

Figure 1:
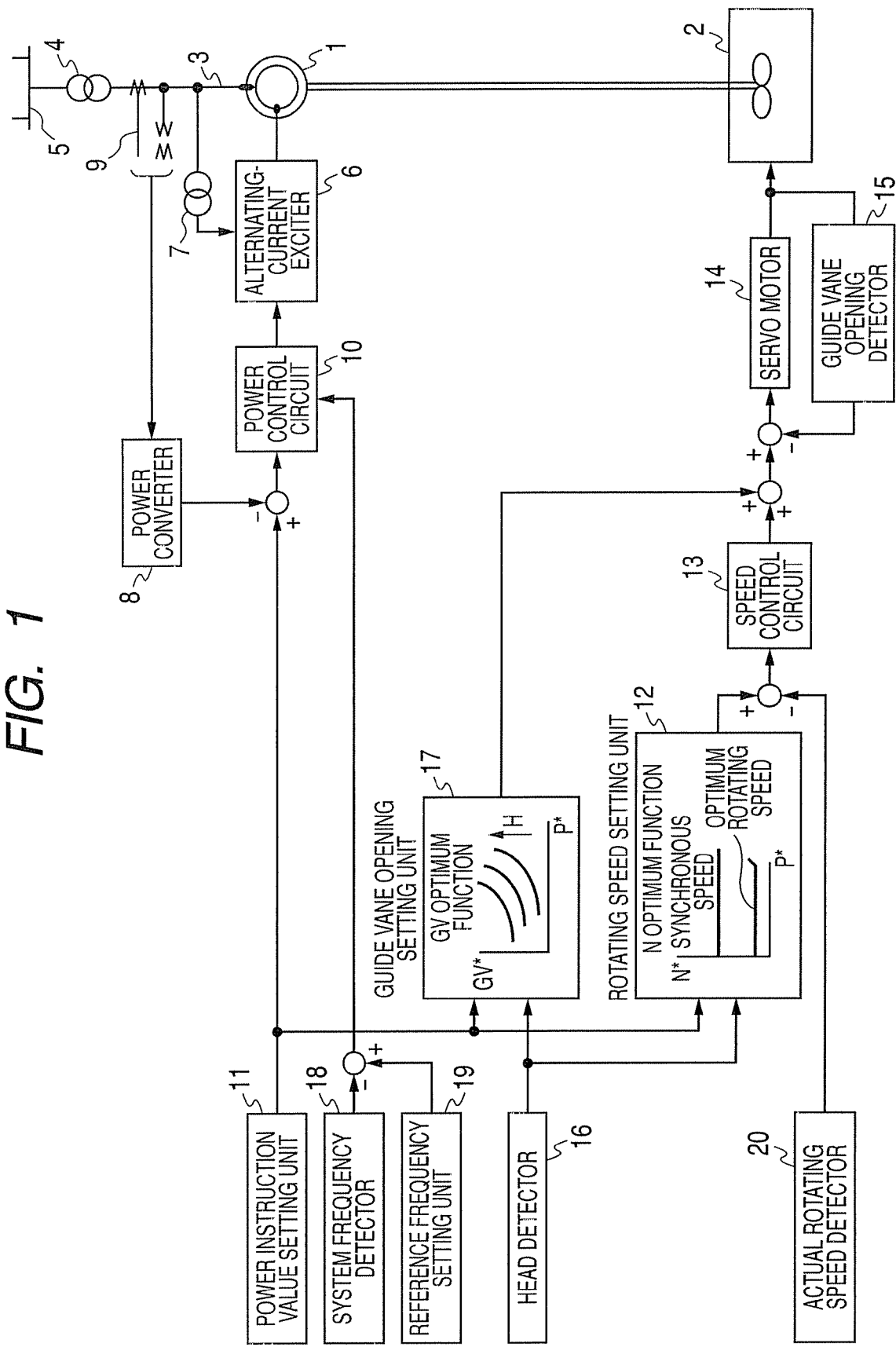
FIG. 1 is a control block diagram showing a first embodiment of the present invention.

In FIG. 1, the rotor of a double fed synchronous generator motor 1 is driven by a reversible pump-turbine 2, and the winding of the stator of the double fed synchronous generator motor 1 is connected to an electric power system 5 through a generator bus bar 3 and a main transformer 4. An alternating-current (AC) exciting device 6 is supplied with power from the generator bus bar 3 through an exciting transformer 7, and supplies the winding of the rotor of the double fed synchronous generator motor 1 with AC exciting current having the frequency corresponding to the difference between the system frequency and the rotating speed. A power converter 8 detects the output of the double fed synchronous generator motor 1 from a secondary-side signal of a current & voltage transformer 9 connected to the generator bus bar 3. A power control circuit 10 generates such a control signal that the output detected by the power converter 8 is coincident with the signal of a power instruction value setting unit 11, supplies the control signal to the AC exciting device 6 and adjusts the output of the double fed synchronous generator motor 1 on the basis of the output of the AC exciting device 6. The output of the double fed synchronous generator motor 1 can be instantaneously adjusted by reducing the rotating speed thereof to discharge energy or increasing the rotating speed to absorb energy from the system. This is the main feature of the double fed synchronous generator motor.

If the reversible pump-turbine 2 adjusts the output corresponding to the power adjusted by the double fed synchronous generator motor 1, the rotating speed is restored to a value before the power adjustment. In general, the output control of the reversible pump-turbine 2 is later than the output control of the double fed synchronous generator motor 1 because of delay of a water channel system and a mechanical system. The rotating speed setting unit 12 sets as the optimum rotating speed a rotating speed at which the maximum efficiency is obtained for each output in the power generating operation. It outputs the optimum rotating speed instruction value corresponding to the value of the power instruction value, and supplies a difference signal between the optimum rotating speed and the actual rotating speed from an actual rotating speed detector 20 to a speed control circuit 13. The speed control circuit 13 adjusts the guide vane opening of the reversible pump-turbine 2 by a servo motor 14 and a guide vane opening detector 15 so that the rotating speed of the reversible pump-turbine 2 is equal to the optimum rotating speed. Since the optimum rotating speed is slightly varied in accordance with the head in an area where output is large, a head signal is supplied from a head detector 16 to the rotating speed setting unit 12 to correct the optimum rotating speed on the basis of the head. The water turbine efficiency of the reversible pump-turbine 2 is also dependent on the guide vane opening and the head in addition to the rotating speed. A guide vane opening setting unit 17 increases the guide vane opening to a larger value as the power instruction value is larger. When the guide vane opening is set to a larger value as the head signal from the head detector 16 is higher, the operation can be performed with a high water turbine efficiency. The servo motor 14 is controlled so that the guide vane opening detected by the guide vane opening detector 15 is coincident with the guide vane opening signal from the guide vane opening setting unit 17 so that the guide vane opening of the reversible pump-turbine 2 is controlled to be equal to the optimum value.

The system frequency detected by a system frequency detector 18 and a reference frequency from a reference frequency setting unit 19 are taken into the power control circuit 10, and the AC exciting device 6 is supplied with a control signal obtained by adding the difference between the power instruction value and the actual power with a speed drop rate characteristic so that the double fed synchronous generator motor 1 can automatically output the output power which is conformed with the state of the power system 5.

Next, the operation will be described. The water turbine efficiency of the reversible pump-turbine 2 for variable speed pumped-storage power generation is more excellent as the rotating speed is lower. Accordingly, the optimum rotating speed has been hitherto set to the lower limit of the variable speed width of the double fed synchronous generator motor 1 as shown in the rotating speed setting unit 12 of FIG. 1.

Figure 2:
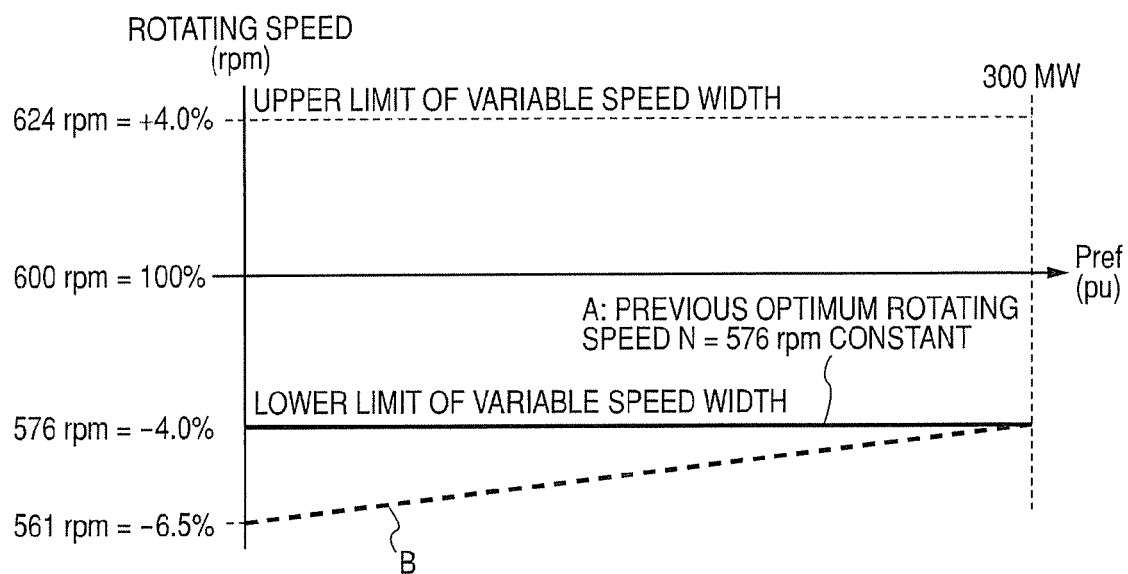
FIG. 2 is a diagram showing an example of the operation of the first embodiment according to the present invention.

The optimum rotating speed of the double fed synchronous generator motor 1 will be described by using as a specific example of the synchronous speed of 600 rpm, the variable speed width of ±4% and the output of 300 MW in the rotating speed setting unit 12 of FIG. 1 with reference to FIG. 2.

The optimum rotating speed has been hitherto set to a fixed value of 576 rpm as the lower limit of the variable speed width irrespective of the power instruction value as shown in FIG. 2A. Furthermore, a permissible maximum output voltage is one performance of the AC exciting device 6 of FIG. 1, and the variable speed width of the double fed synchronous generator motor 1 is determined by this voltage.

The relationship of various quantities is as follows.

$$Vex \leq Vr \quad (1)$$

Vr: Rated output voltage of the AC exciting device 6
Vex: Exciting voltage $$Vex = If \cdot (Rf + j \cdot 2\pi \cdot fex \cdot Lf) \quad (2)$$

If: Exciting current=output current (A) of the exciting device
Rf: Resistance (Ω) of rotor winding of double fed synchronous generator motor 1
Lf: Inductance (G) of rotor winding of the double fed synchronous generator motor 1
Fex: Frequency of exciting current (called as slip frequency) (Hz)

$$Fex = fs - fo \cdot N/Ns \quad (3)$$

Fs: System frequency (Hz)
Fo: reference frequency (50 Hz or 60 Hz) of the system
Ns: Synchronous speed (rpm) of the double fed synchronous generator motor
N: Rotating speed (rpm) of the double fed synchronous generator motor 1

Even when the output voltage of the AC exciting device 6 is fixed to a fixed value, the exciting current If may be small if the output of the double fed synchronous generator motor 1 is small, and thus it is found from the equation (2) that the slip frequency fex can be increased. For example, if it is assumed that the lower limit 4% of the variable speed width can be increased to 6.5% when the output of the double fed synchronous generator motor 1 is equal to zero and the magnitude of the exciting current If is assumed to be substantially proportional to the output, the new optimum rotating speed curve as represented by B can be obtained.

B: N1=15×Pref (pu)+561 (rpm)

By operating the double fed synchronous generator motor 1 at this new optimum rotating speed B, the power generation efficiency under a partial load can be enhanced. For example, in the case of a pumped-storage power generator of rated 300 MW, the power generation amount on the scale of 1000 MWH can be expected to increase for one year.

As described above, according to the first embodiment, the double fed synchronous generator motor which is coupled to the reversible pump-turbine 2 and operated while switched to the power generating operation mode or the pumping operation mode is equipped with the controller (the power control circuit 10) for controlling the double fed synchronous generator motor so that the power output by the double fed synchronous generator motor 1 is coincident with the instruction value and the rotating speed is set between upper and lower limit values of the rotating speed by changing the exciting current. In the power generating operation mode, the lower limit value of the rotating speed is varied by active power output from the double fed synchronous generator motor, and when the active power is small, the lower limit value of the rotating speed is set to a smaller value than that when the active power is large. Accordingly, the operation can be performed with a higher efficiency as compared with the case where the lower limit value of the rotating speed is fixed irrespective of the active power output by the double fed synchronous generator motor.

Second Embodiment

In the first embodiment, the optimum rotating speed is set on the basis of the power instruction value, and this is based on the assumption that the double fed synchronous generator motor 1 feeds rated reactive power by large excitation current.

Figure 3:
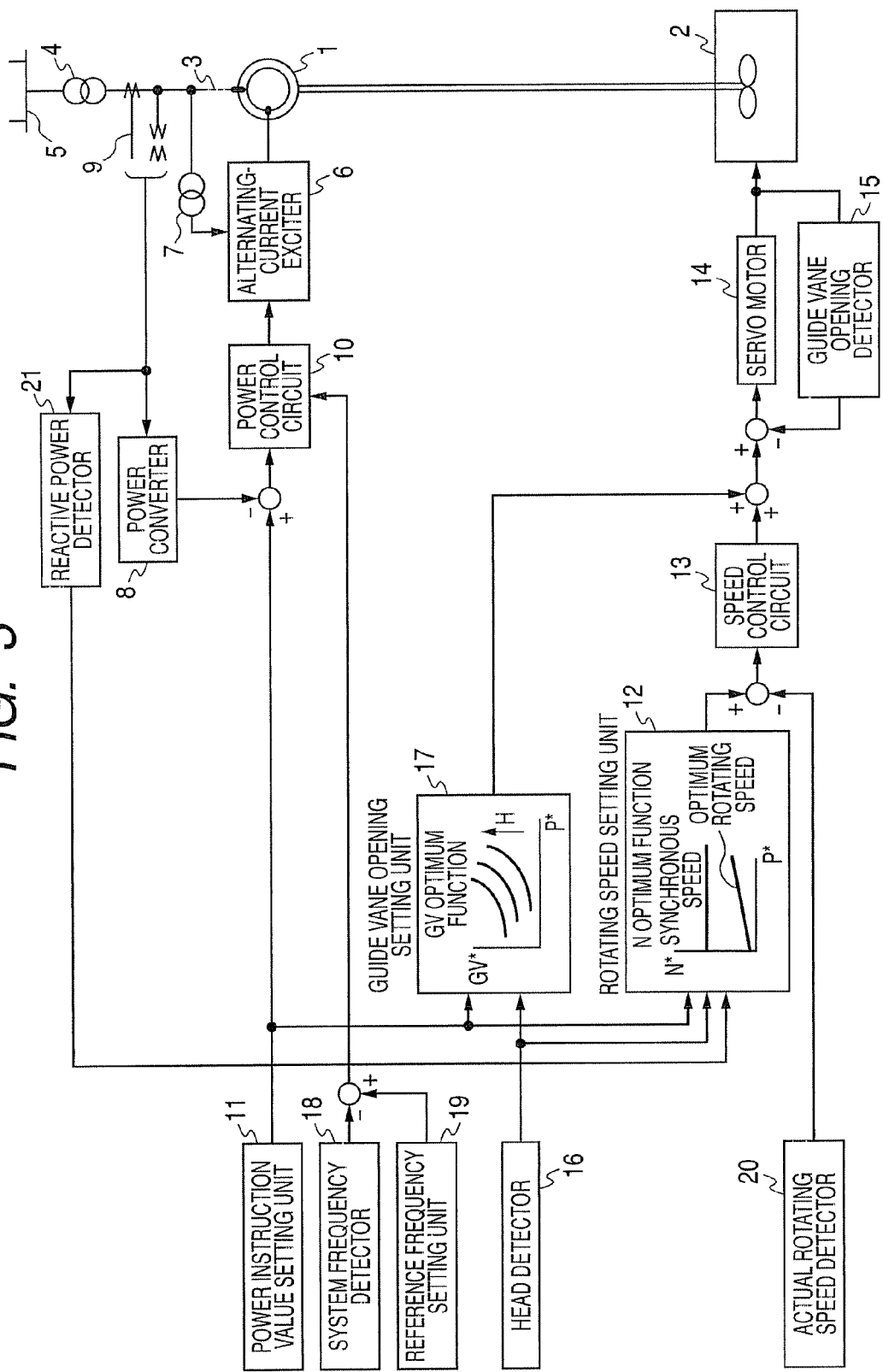
FIG. 3 is a control block diagram showing a second embodiment of the present invention.

In the second embodiment, a reactive power detector 21 is provided as shown in FIG. 3, and the exciting current may be small when the reactive power by large excitation current is equal to a small value below the rated power. Accordingly, the second embodiment provides a control system of correcting the variable speed width so that the variable speed width is further enlarged by the amount corresponding to the reduction of the exciting current and enhancing the power generation efficiency under a partial load.

Figure 4:
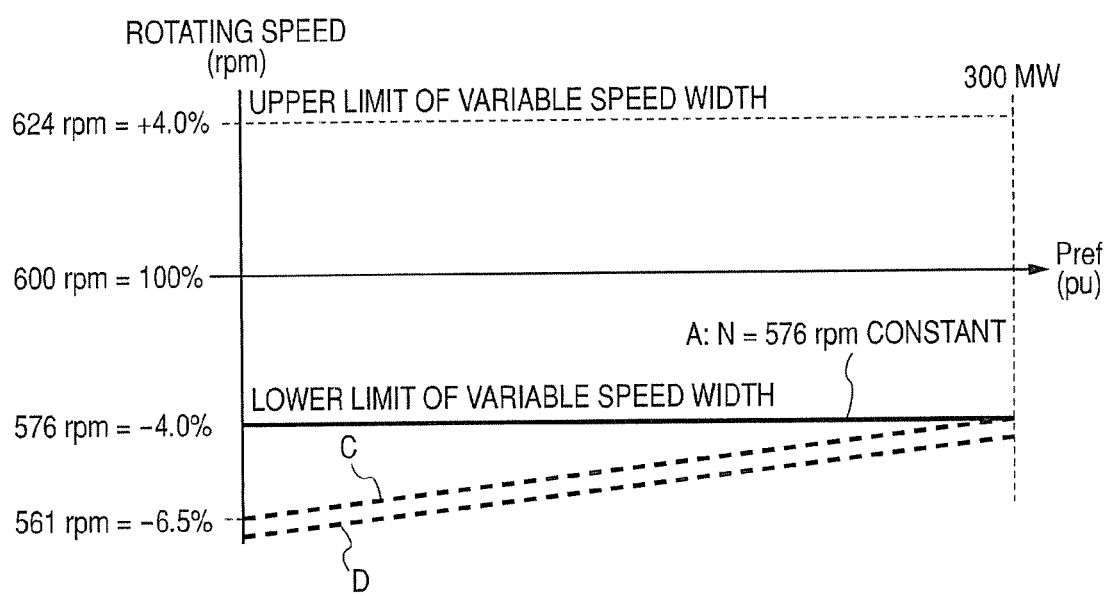
FIG. 4 is a is a diagram showing an example of the operation of the second embodiment according to the present invention.

FIG. 4 shows an example of the operation. The new optimum rotating speed "N=15×Pref (Pu)+561 (rpm)" described in the first embodiment is corrected by using actual reactive power by large excitation current Qact (mvar) and rated reactive power by large excitation current Qrate (mvar), thereby determining the new optimum rotating speed N2 (rpm) according to the following equation.

New optimum rotating speed N2 (rpm)=15×Pref (pu)+ 561 (rpm)−k×(Qrate−Qact)

Here, k represents a constant.

In the case of Qact=Qrate, a curve c shown in FIG. 4 is obtained, and it is identical to a curve B of the first embodiment.

Curve $C:N2$ (rpm)=15×Pref(pu)+561 (rpm)

In the case of Qact=0, a curve D shown in FIG. 4 is obtained, and the rotating speed instruction value is reduced by the amount corresponding to only "k×Qrate", so that high-efficient operation can be performed.

Curve $D:N2$ (rpm)=15×Pref(pu)+561 (rpm)−k×Qrate

Third Embodiment

In the first embodiment, the optimum rotating speed is set on the basis of the power instruction value, and it is based on the assumption that the double fed synchronous generator motor 1 feeds power at the rated lagging power factor.

Figure 5:
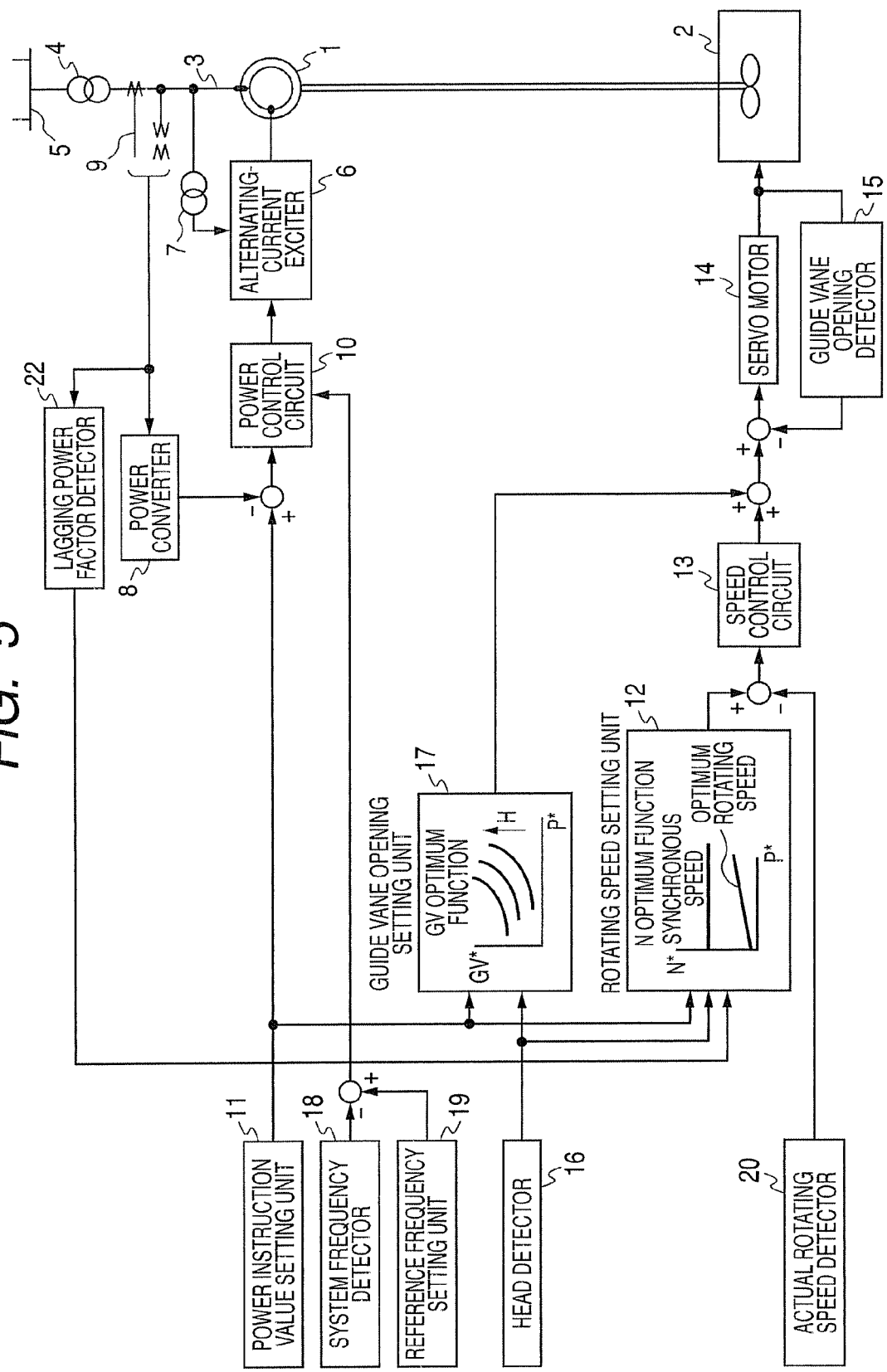
FIG. 5 is a control block diagram showing a third embodiment of the present invention.

In the third embodiment, a lagging power factor detector 22 is provided as shown in FIG. 5, and the exciting current may be small when the lagging power factor is near to 1. Accordingly, the third embodiment provides a control system of correcting the variable speed width so that the variable speed width is further enlarged by the amount corresponding to the reduction of the exciting current and enhancing the power generation efficiency under a partial load.

Figure 6:
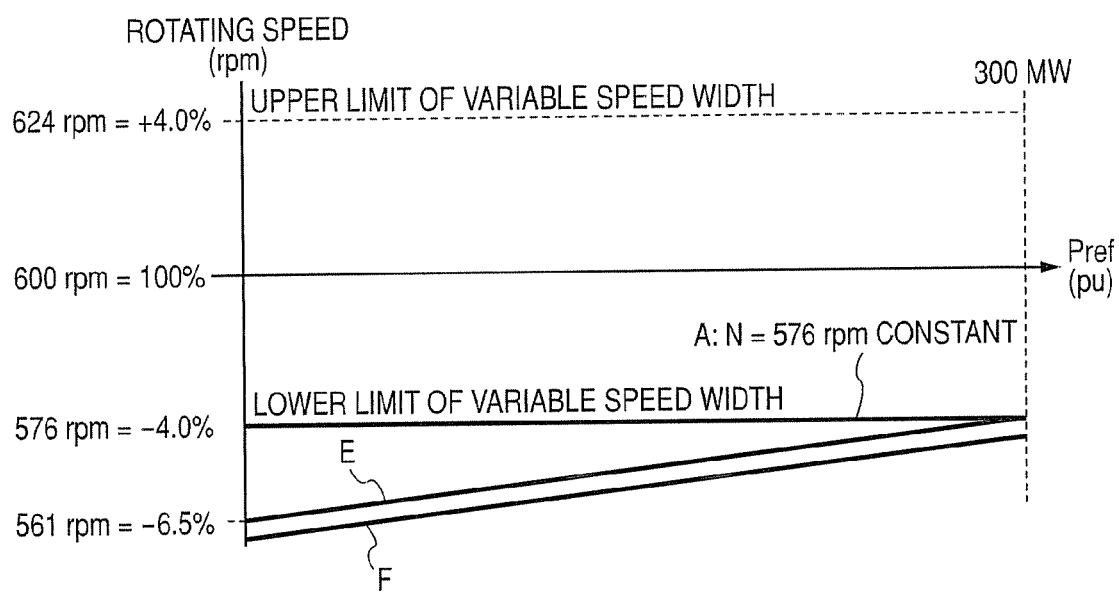
FIG. 6 is a diagram showing an example of the operation of the third embodiment according to the present invention.

FIG. 6 shows an example of the operation. The new optimum rotating speed "N=15×Pref(Pu)+561 (rpm)" described in the first embodiment is corrected by using an actual lagging power factor Pfact(%) and a rated lagging power factor Pfrate (%), thereby determining the new optimum rotating speed N3 (rpm) according to the following equation.

New optimum rotating speed $N3$ (rpm)=15×Pref(pu)+ 561 (rpm)−k×(Pfact−Pfrate)

Here, k represents a constant. The operation is assumed to be carried out so as to satisfy Pfrate (%)<Pfact (%)<100 (%).

In the case of Pfact=Pfrate, a curve E shown in FIG. 6 is obtained, and it is identical to the curve B of the first embodiment.

Curve $E:N3$ (rpm)=15×Pref(pu)+561 (rpm)

In the case of Pfact=100(%), a curve F shown in FIG. 6 is obtained, and the rotating speed instruction value is reduced by only "k×(100−Pfrate)", and thus higher-efficient operation can be performed.

Curve $F:N3$ (rpm)=15×Pref(pu)+561 (rpm)−k×(100 −Pfrate)

Fourth Embodiment

Figure 7:
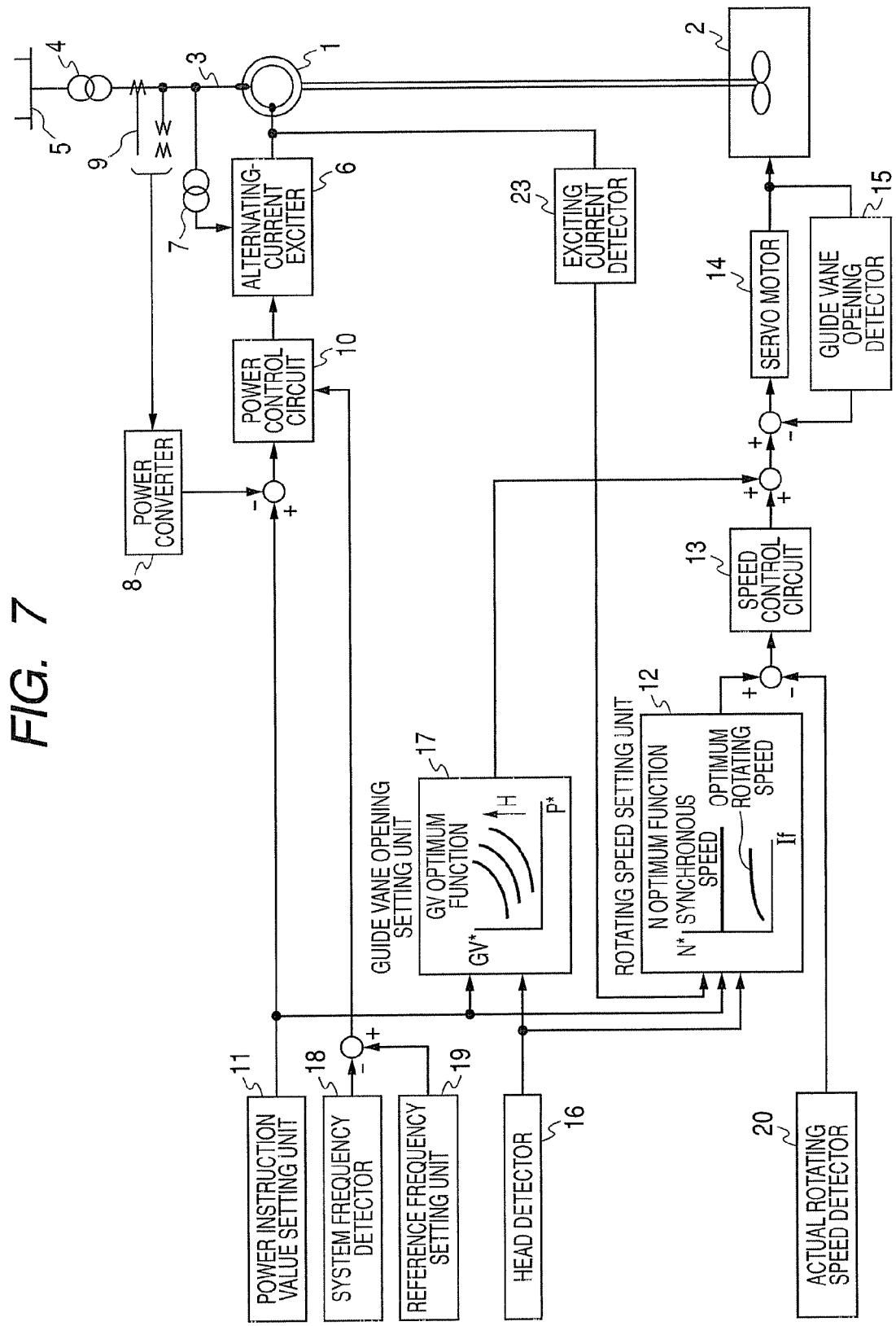
FIG. 7 is a control block diagram showing a fourth embodiment of the present invention.

In the first embodiment, the optimum rotating speed is set on the basis of the power instruction value. In the fourth embodiment, an exciting current detector 23 is provided as shown in FIG. 7, and the fourth embodiment provides a control system of setting the optimum rotating speed on the basis of the system frequency and the exciting current and enhancing the power generation efficiency under a partial load.

From the equations (1), (2) and (3), it is found that the rotating speed during power generating operation is restricted from the constant of equipment, the exciting current under operation and the system frequency. By substituting the equation (3) into the equation (2), the equation (4) is obtained.

$Vex=If \cdot (Rf+j \cdot 2 \cdot \pi \cdot (fs-fo \cdot N/Ns) \cdot Lf)$ equation (4)

Normally, the system frequency is substantially equal to the reference frequency, and thus fs=fo=1 pu=60 Hz or 50 Hz, and Rf is small and thus neglected, so that the equation (5) is obtained from the equation (4).

$Vex=If \cdot (2 \cdot \pi \cdot fo \cdot (Ns-N)/Ns) \cdot Lf$ (5)

By solving the equation (5) for N, the equation (6) is obtained.

$N=Ns-Ns \cdot Vex/(2\pi foLf)) \cdot 1/If$ (6)

When Vex is fixed to the rated value in the equation (6), the following equation (7) is achieved.

$N=K1K2/If$ (7)

Here, K1=Ns, K2=Ns·Vex/(2πfoLf)

If the rotating speed is equal to 561 rpm for If=0.1 (pu) and the rotating speed is equal to 576 rpm for If=1.0 (pu), the equation (8) is obtained from the equation (7).

$N=577.67-1.67/If$ (8)

Figure 8:
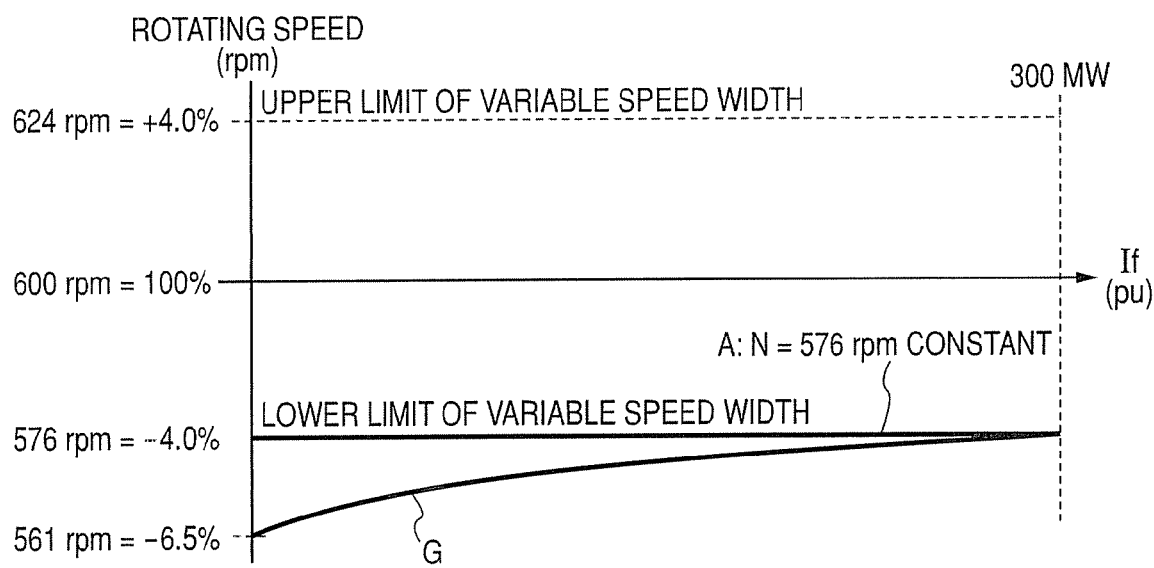
FIG. 8 is a diagram showing an example of the operation of the fourth embodiment according to the present invention.

The equation (8) provides the new optimum rotating speed G of FIG. 8 as follows:

$G:N4=577.67-1.67/If$ (rpm)

Fifth Embodiment

In the first embodiment, the optimum rotating speed is set on the basis of the power instruction value. This aims at an operation system to enhance the efficiency over the whole area of the power generation output. Accordingly, the actual rotating speed during power generating operation is operated at the lower limit of the variable speed width, and thus when a power increasing instruction is received, the power control circuit 10 of FIG. 1 acts to immediately reduce the rotating speed and discharge the rotational energy to thereby output an electrical output. However, the power increasing instruction is corrected by a variable speed width deviation preventing function in the power control circuit 10 so that the rotating speed is not reduced to the new optimum rotating speed B shown in FIG. 2 or less. As a result, the power increases at a relatively slow response speed by the characteristics of the speed control circuit 13, the servo motor 14, the reversible pump-turbine 2, a water channel system and a governor.

In other words, the active use of the rotational energy as the most important feature of the variable speed machine is restricted, and thus the response speed of the power control is sacrificed.

The fifth embodiment provides a control system for enhancing the response speed of the power control although the efficiency of the power generating operation is slightly sacrificed. It will be specifically described with reference to FIG. 9. The new optimum rotating speed B set in FIG. 2 is corrected by only +α to provide the following latest optimum rotating speed H:

$H:N5=15 \times Pref(pu)+561$ (rpm) +α

Accordingly, the actual rotating speed during power generating operation is controlled to be equal to the latest optimum rotating speed H, and also restricted so that it is not reduced to the new optimum rotating speed B or less. In other words, the new optimum rotating speed B becomes the lower limit rotating speed of the variable speed width.

First, a case where the system of this fifth embodiment is not applied will be described with reference to FIG. 9.

When a power instruction value Po is increased to $P_1$ at a time To in FIG. 9, the actual rotating speed is controlled to be equal to the new optimum rotating speed B of FIG. 2, and the rotating speed cannot be reduced to any value below this curve, so that the actual power slowly increases from Po to $P_1$ at a relatively slow response speed of the speed control circuit 13, the servo motor 14, the reversible pump-turbine 2 and the water channel system shown in FIG. 1 as indicated by actual power 1 of FIG. 9. The power instruction value instantaneously increases and thus the optimum rotating speed instruction value also instantaneously increases from No to $N_1$. However, the actual rotating speed is set to the lower limit of the variable speed width, and thus it cannot be further reduced, so that the actual rotating speed increases to the optimum rotating speed $N_1$ at $P_1$ like the actual rotating speed 1 shown in FIG. 9. The increasing speed of the rotating speed is determined by the response speeds of the water channel system and the governor system, and the operation is the same as the conventional power generating operation using a synchronous machine.

Next, a case where the system of the fifth embodiment is applied will be described with reference to FIG. 9.

Figure 9:
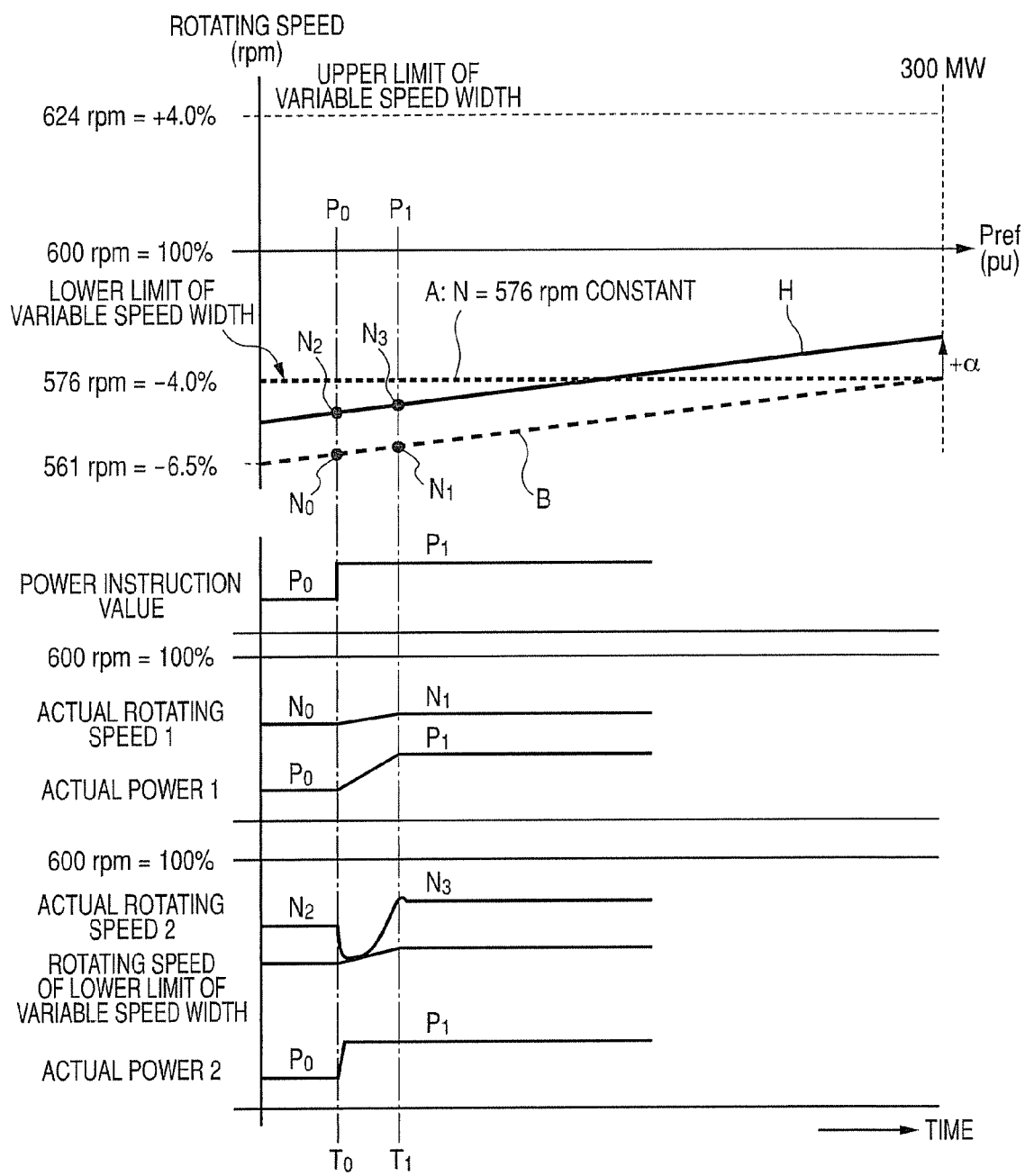
FIG. 9 is a diagram showing an example of the operation of a fifth embodiment according to the present invention.

When the power instruction value Po is increased $P_1$ at the time To in FIG. 9, the double fed synchronous generator motor 1 instantaneously discharges the rotational energy to the system. Therefore, the actual rotating speed temporarily decreases from $N_2$ so that it does not underrun the lower limit rotating speed of the new variable speed width like an actual rotating speed 2, and also and then increases to the optimum rotating speed $N_3$ corresponding to $P_1$. Accordingly, the actual power instantaneously increases like the actual power 2. This is possible because the latest optimum rotating speed H is set to be higher than the new optimum rotating speed B, that is, the lower limit rotating speed of the variable speed width by only +α in advance. The power control system having the high response speed as described above can contribute to stabilization of the power system 5.

Sixth Embodiment

In the second embodiment, the optimum rotating speed is set by the power instruction value, and the exciting current may be small when the reactive power by large excitation current is a small value below the rated value. Therefore, there is provided the control system of correcting the variable speed width so that the variable speed width is further enlarged in accordance with the amount of the reactive power by large excitation current and enhancing the power generation efficiency under a partial load. This aims at an operation system of enhancing the efficiency over the whole area of the power generation output.

Accordingly, the rotating speed during power generating operation is set to the optimum rotating speed of the permitted lowest limit such as the new optimum rotating speed C of FIG. 4, the new optimum rotating speed D or the intermediate value therebetween in accordance with the magnitude of the reactive power by large excitation current on each occasion. Therefore, when the power increasing instruction is received, the power control circuit 10 of FIG. 3 acts to immediately reduce the rotating speed to discharge the rotational energy, thereby outputting an electrical output. However, the power increasing instruction is corrected by the variable speed width deviation preventing function in the power control circuit 10 so that the rotating speed is not reduced to the optimum rotating speed shown in FIG. 3 or less. As a result, the power increases at a relatively slow response speed based on the characteristics of the speed control circuit 13, the servo motor 14, the reversible pump-turbine 2, the water channel system and the governor.

In other words, the active use of the rotational energy which is the most important feature of the variable speed machine is restricted, and the response speed of the power control is sacrificed.

The sixth embodiment provides the control system of slightly sacrificing the efficiency of the power generating operation, but enhancing the response speed of the power control. It will be specifically described with reference to FIG. 10. As described below, the new optimum rotating speed C set in the second embodiment is corrected by only +α to provide a latest optimum rotating speed I, and the new optimum rotating speed D is corrected by only +α to provide a latest optimum rotating speed J.

$I: N6 = 15 \times Pref(pu) + 561 (rpm) - k \times (Q(rate) - Q(mvar))$
$+ \alpha$ for Q(mvar)=Q(rate), k:coefficient $J: N6 = 15 \times Pref(pu) + 561 (rpm) - k \times (Q(rate) - (mvar))$
$+ \alpha$ for Q(mvar)=0

Accordingly, the actual rotating speed during power generating operation is controlled to be equal to the latest optimum rotating speed I, the latest optimum rotating speed J or the intermediate value therebetween in accordance with the amount of the reactive power by large excitation current on each occasion, and also restricted so that it is not below the new optimum rotating speed C or D or the intermediate value therebetween.

In other words, the new optimum rotating speed C or D or the intermediate value therebetween is set to the lower limit rotating speed of the variable speed width.

First, a case where the system of the sixth embodiment is not applied, and the reactive power by large excitation current is equal to zero will be described with reference to FIG. 10.

In the case where the power instruction value Po is increased to $P_1$ at the time To in FIG. 10, if the actual rotating speed is controlled to be equal to the new optimum rotating speed C as shown in FIG. 4, this rotating speed cannot be reduced to any value below this curve, and thus the actual power slowly increases from Po to $P_1$ at a relatively slow response speed of the speed control circuit 13, the servo motor 14, the pup water turbine 2 and the water channel system shown in FIG. 3 as in the case of the actual power 1 of FIG. 10. The power instruction value instantaneously increases and thus the optimum rotating speed instruction value also instantaneously increases. However, the actual rotating speed is set to the lower limit of the variable speed width, and thus it cannot be further reduced, so that it increases to the optimum rotating speed $N_1$ at $P_1$ as in the case of the actual rotating speed 1 of FIG. 10. The increasing speed of the rotating speed is determined by the response speeds of the water channel system and the governor system, and the operation thereof is the same as the power generating operation using the conventional synchronous machine.

Next, a case where the system of the sixth embodiment is applied and for example the reactive power by large excitation current is equal to zero will be described with reference to FIG. 10.

Figure 10:
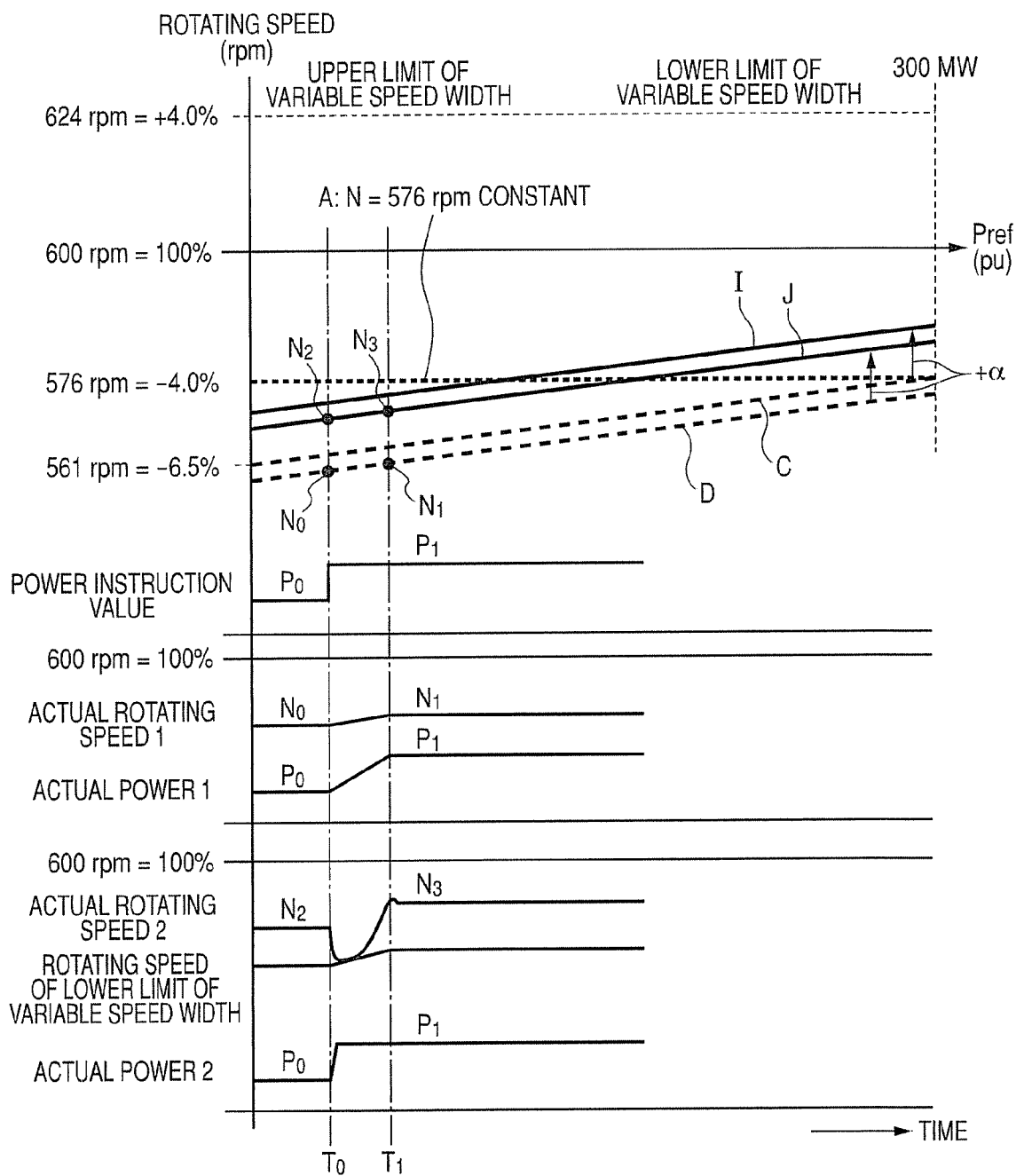
FIG. 10 is a diagram showing an example of the operation of a sixth embodiment according to the present invention.

When the power instruction value Po is increased to $P_1$ at the time To in FIG. 10, the double fed synchronous generator motor 1 instantaneously discharges the rotational energy to the system, and thus the actual rotating speed temporarily decreases from $N_2$ and then increases to the optimum rotating speed $N_3$ corresponding to $P_1$ as in the case of the actual rotating speed 2. Accordingly, the actual power instantaneously increases like actual power 2. This is possible because the latest optimum rotating speed J is set to a higher value than the new optimum rotating speed D, that is, the lower limit rotating speed of the variable speed width by only +α. The power control system having the high response speed as described above can contribute to stabilization of the power system 5.

Seventh Embodiment

In the control system of the third embodiment, the optimum rotating speed is set on the basis of the power instruction value, and when the lagging power factor is equal to 1, the reactive power by large excitation current and the exciting current may be set to small values. Therefore, the variable speed width is controlled to be further enlarged in accordance with the magnitude of the lagging power factor and the power generation efficiency under a partial load is enhanced. This aims at the operation system of enhancing the efficiency on each occasion over the whole area of the power generation output.

Accordingly, the rotating speed during power generating operation is set to the optimum rotating speed of the permitted lowest limit such as the new optimum rotating speed E, the new optimum rotating speed F or the intermediate value therebetween shown in FIG. 6 in accordance with the magnitude of the lagging power factor on each occasion, and thus when the power increasing instruction is received, the power control circuit 10 of FIG. 5 immediately acts to reduce the rotating speed and discharge the rotational energy to thereby output an electrical output. However, the power increasing instruction is corrected by the variable speed width deviation preventing function in the power control circuit 10 so that the rotating speed does not underrun the optimum rotating speed shown in FIG. 6. As a result, the power increases as a relatively slow response speed based on the characteristics of the speed control circuit 13, the servo motor 14, the reversible pump-turbine 2, the water channel system and the governor.

In other words, the active use of the rotational energy which is the most important feature of the variable speed machine is restricted, and the response speed of the power control is sacrificed.

The seventh embodiment provides a control system of enhancing the response speed of the power control although the efficiency of the power generating operation is slightly sacrificed. The details thereof will be described with reference to FIG. 11. The new optimum rotating speed E set in the third embodiment is corrected by only +α to provide the latest optimum rotating speed K, and the new optimum rotating speed F is corrected by only +α to provide the latest optimum rotating speed L as follows.

$K: N7 = 15 \times Pref(pu) + 561 \text{ (rpm)} - k \times Pf + \alpha$ for Pf=Pf(rate) k: coefficient $L: N7 = 15 \times Pref(pu) + 561 \text{ (rpm)} - k \times Pf + \alpha$ for Pf=1 k: coefficient Accordingly, the actual rotating speed during power generating operation is controlled to be equal to the latest optimum rotating speed K, the latest optimum rotating speed L or the intermediate value therebetween in accordance with the magnitude of the lagging power factor on each occasion, and also restricted so that it is not below the new optimum rotating speed E or F or the intermediate value therebetween.

In other words, the new optimum rotating speed E or F or the intermediate value therebetween is set to the lower limit rotating speed of the variable speed width.

First, a case where the system of the seventh embodiment is not applied and for example the lagging power factor is equal to 1 will be described with reference to FIG. 11.

In the case where the power instruction value Po is increased to $P_1$ at the time To in FIG. 11, if the actual rotating speed is controlled to be equal to the new optimum rotating speed F as shown in FIG. 6, the rotating speed cannot be not reduced to any value below this curve, and thus the actual power slowly increases from Po to $P_1$ at a relatively slow response speed of the speed control circuit 13, the servo motor 14, the reversible pump-turbine 2 and the water channel system shown in FIG. 5 as in the case of the actual power 1 of FIG. 11. The power instruction value instantaneously increases and thus the optimum rotating speed instruction value also instantaneously increases. However, the actual rotating speed is set to the lower limit of the variable speed width, and thus it cannot be further reduced, so that the actual rotating speed increases to the optimum rotating speed $N_1$ at $P_1$ as in the case of the actual rotating speed 1 shown in FIG. 11. The increasing speed of this rotating speed is determined by the response speeds of the water channel system and the governor system, and the operation thereof is the same as the power generating operation using the conventional synchronous machine.

Next, a case where the system of the seventh embodiment is applied and for example the reactive power by large excitation current is equal to zero will be described with reference to FIG. 11.

Figure 11:
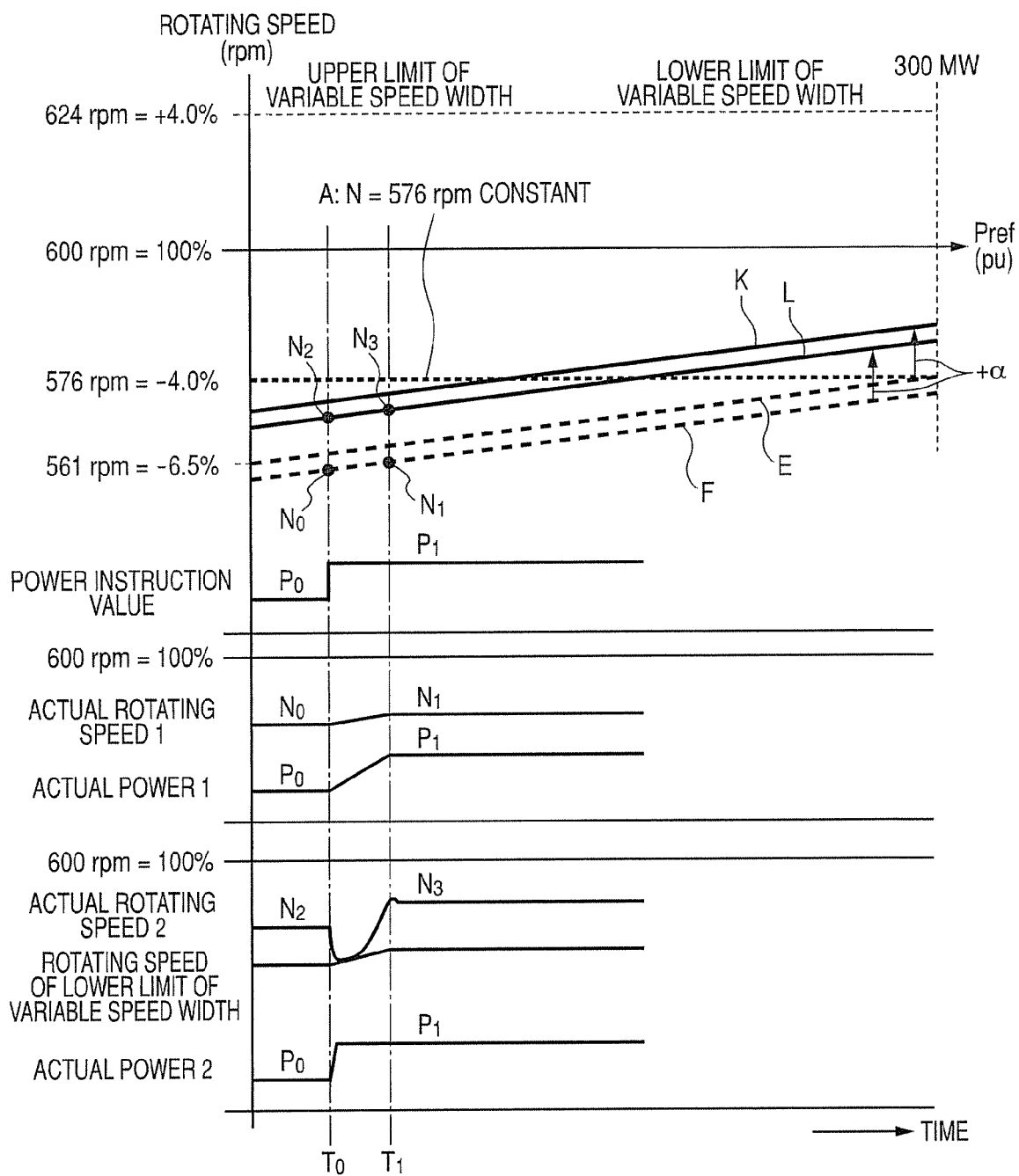
FIG. 11 is a diagram showing an example of the operation of a seventh embodiment according to the present invention.

When the power instruction value Po is increased to $P_1$ at the time To in FIG. 11, the double fed synchronous generator motor 1 instantaneously discharges the rotational energy to the system, and thus the actual rotating speed temporarily decreases from $N_2$ and then increases to the optimum rotating speed $N_3$ corresponding to $P_1$ as in the case of the actual rotating speed 2. Accordingly, the actual power instantaneously increases as in the case of the actual power 2. This is possible because the latest optimum rotating speed L is set to be higher than the new optimum rotating speed F, that is, the lower limit rotating speed of the variable speed width by only +α in advance. The power control system having the high response speed as described above can contribute to stabilization of the power system 5.

Eight Embodiment

The fourth embodiment provides the control system of setting the optimum rotating speed on the basis of the power instruction value, further correcting the variable speed width so as to enlarge the variable speed width in accordance with the magnitude of the exciting current and enhancing the power generation efficiency under a partial load. This aims at the operation system of enhancing the efficiency over the whole area of the power generation output.

Accordingly, the actual rotating speed during power generating operation is operated at the lower limit of the variable speed width, and thus when the power increasing instruction is received, the power control circuit 10 of FIG. 7 instantaneously acts to reduce the rotating speed and discharge the rotational energy to output an electrical output. However, the power increasing instruction is corrected by the variable speed width deviation preventing function in the power control circuit 10 so that the rotating speed is not reduced to the new optimum rotating speed G shown in FIG. 8 or less. As a result, the power increases at a relatively slow response speed based on the characteristics of the speed control circuit 13, the servo motor 14, the reversible pump-turbine 2, the water channel system and the governor.

In other words, the active use of the rotational energy which is the most important feature of the variable speed machine is restricted and the response speed of the power control is sacrificed.

The eighth embodiment provides a control system of slightly sacrificing the efficiency of the power generating operation, but enhancing the response speed of the power control. The details thereof will be described with reference to FIG. 12. The new optimum rotating speed G set in the fourth embodiment is corrected by only +α to provide the following latest optimum rotating speed M.

$$M:N8=577.67-1.67/\text{If (rpm)}+\alpha$$

Accordingly, the actual rotating speed during power generating operation is controlled to be equal to the latest optimum rotating speed M, and restricted so that it is not below the new optimum rotating speed G. In other words, the new optimum rotating speed G becomes the lower limit rotating speed of the variable speed width.

First, a case where the system of the eighth embodiment is not applied will be described with reference to FIG. 12.

When the power instruction value Po is increased to $P_1$ at the time To in FIG. 12, the actual rotating speed is controlled to be equal to the new optimum rotating speed G of FIG. 8, but the rotating speed cannot be reduced to any value below this curve, so that the actual power slowly increases from $P_0$ to $P_1$ at a relatively slow response speed of the speed control circuit 13, the servo motor 14, the reversible pump-turbine 2 and the water channel system shown in FIG. 7 as in the case of the actual power 1 of FIG. 12. The power instruction value instantaneously increases and thus the optimum rotating speed instruction value instantaneously increases from No to $N_1$. However, the actual rotating speed is set to the lower limit of the variable speed width, so that the actual rotating speed cannot be further reduced and it increases to the optimum rotating speed $N_1$ at $P_1$ as in the case of the actual rotating speed 1 shown in FIG. 12. The increasing speed of this rotating speed is determined by the response speeds of the water channel system and the governor system, and the operation thereof is the same as the power generating operation using the conventional synchronous machine.

Next, a case where the system of the eighth embodiment is used will be described with reference to FIG. 12.

Figure 12:
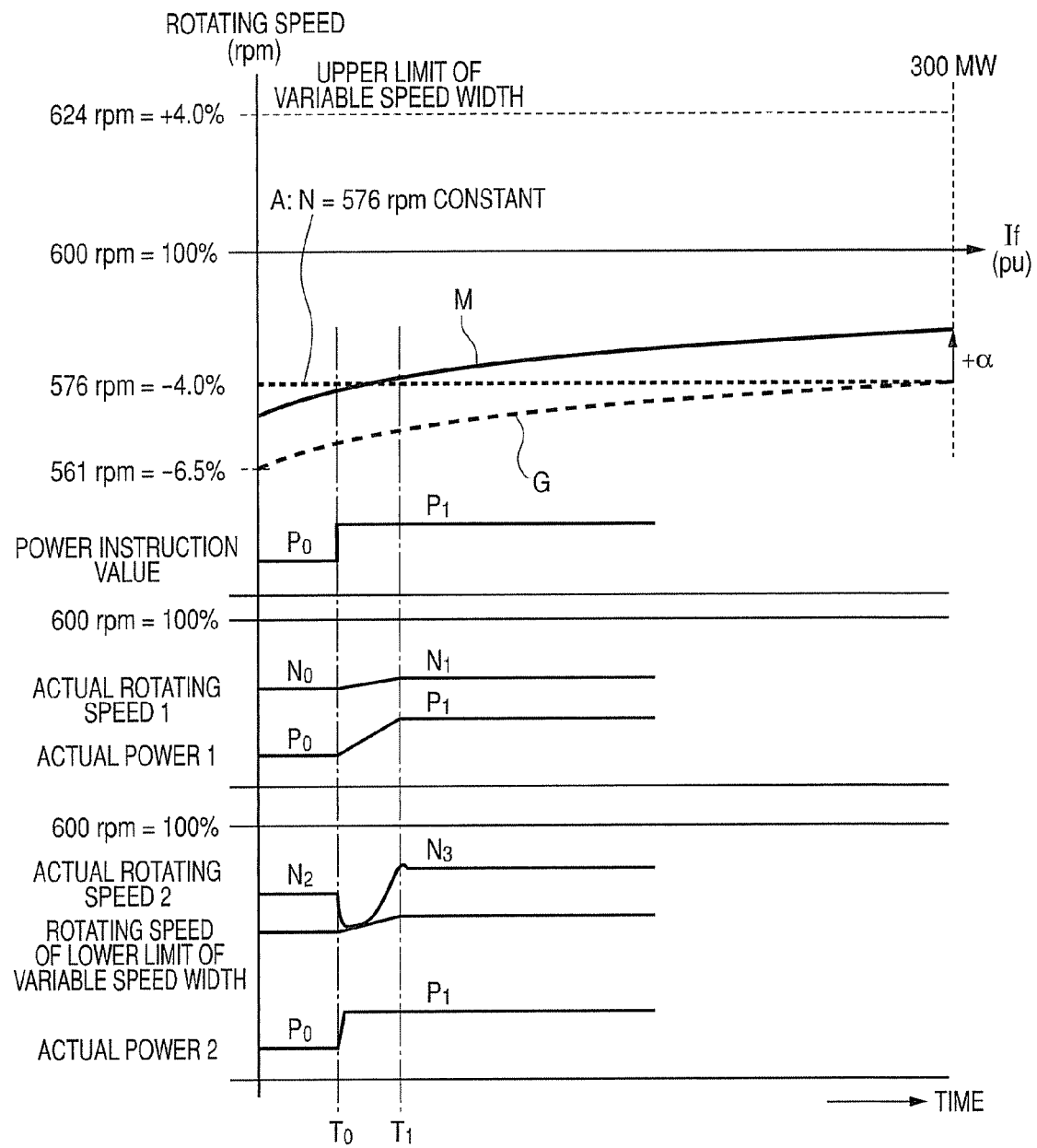
FIG. 12 is a diagram showing an example of the operation of an eighth embodiment according to the present invention.

Now, if the power instruction value Po is increased to $P_1$ at the time To in FIG. 12, the double fed synchronous generator motor 1 instantaneously discharges rotational energy, and thus the actual rotating speed temporarily decreases from $N_2$ so that it does not underrun the lower limit rotating speed of the new variable speed width and then increases to the optimum rotating speed $N_3$ corresponding to $P_1$ as in the case of the actual rotating speed 2. Accordingly, the actual power instantaneously increases as in the case of the actual power 2. This is possible that the latest optimum rotating speed M is set to a value higher than the new optimum rotating speed G, that is, the lower limit rotating speed of the variable speed width by only +α. The power control system having the high response speed as described above can contribute to stabilization of the power system 5.

Ninth Embodiment

The first embodiment aims to obtain the control system of enlarging the variable speed width in the low rotating speed area in the power generating operation of the variable speed pumped-storage power generating system based on the double fed synchronous generator motor 1 to perform the operation in which the partial load efficiency can be enhanced.

However, the ninth embodiments aims to obtain a control system for the double fed synchronous generator motor that can contribute to increase of the AFC capacity by enlarging the variable speed width in a low input area, that is, in a low rotating speed area during pumping operation, the reduction of the capacity of a starting device by reducing the upper limit of the accelerated rotating speed at the start time of the pumping operation and reduction of deterioration of the contact point by reducing the parallel-off rotating speed at the stop time of the pumping operation to reduce the cutoff power.

The ninth embodiment of the present invention will be described with reference to FIG. 13.

Figure 13:
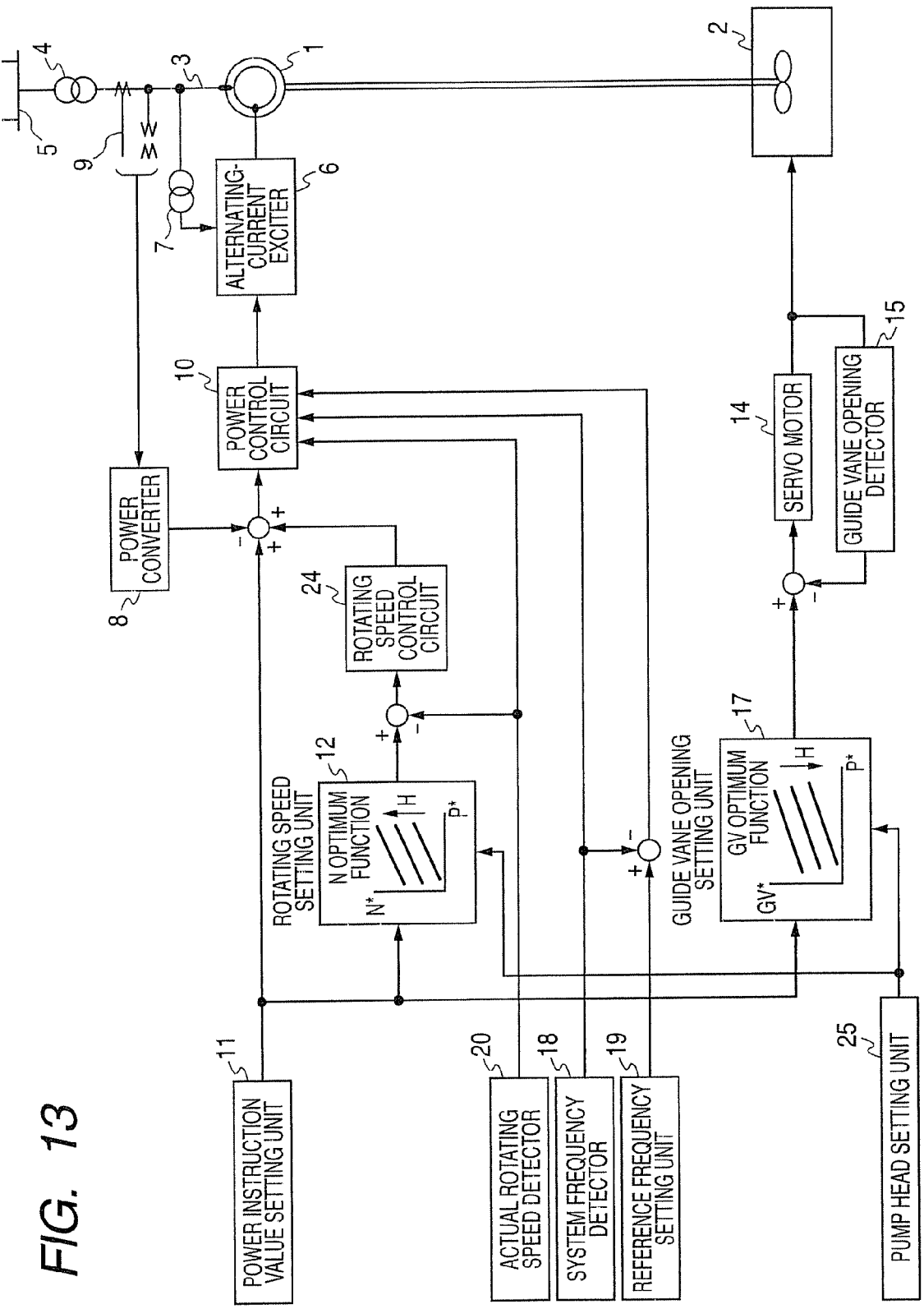
FIG. 13 is a control block diagram showing a ninth embodiment of the present invention.

In FIG. 13, the double fed synchronous generator motor 1 drives the reversible pump-turbine 2 by the rotor, and the winding of the stator is connected to the power system 5 through the generator bus bar 3 and the main transformer 4. The AC exciting device 6 is supplied with power from the generator bus bar 3 through the exciting transformer 7, and supplies the AC exciting current having the frequency corresponding to the difference between the system low frequency and the rotating speed to the winding of the rotor of the double fed synchronous generator motor 1. The power converter 8 detects the input of the double fed synchronous generator motor 1 from the secondary side signal of the current & voltage transformer 9 connected to the generator bus bar 3. The power control circuit 10 generates such a control signal that the output detected by the power converter 8 is coincident with the signal of the power instruction value setting unit 11, supplies the control signal to the AC exciting device 6 and adjusts the input of the double fed synchronous generator motor 1 on the basis of the output of the AC exciting device 6. The input of the double fed synchronous generator motor 1 can be instantaneously adjusted by reducing the rotating speed of the double fed synchronous generator motor 1 to discharge the energy or increasing the rotating speed of the double fed synchronous generator motor 1 to absorb the energy from the system. This is the most important feature of the double fed synchronous generator motor.

In general, the input required in the pumping operation of the reversible pump-turbine 2 varies in proportion to substantially three powers of the rotating speed. When the double fed synchronous generator motor 1 obtains power from the system according to the power instruction value setting unit 11 and applies the power to the reversible pump-turbine 2 as a shaft output, the pumping operation is carried out at the rotating speed corresponding to the input concerned. The optimum rotating speed of the reversible pump-turbine 2 varies in accordance with the pump head. Therefore, the optimum rotating speed corresponding to the input and the pump head is set by the rotating speed setting unit 12, and when the actual rotating speed 20 is deviated from the optimum rotating speed, the rotating speed control circuit 24 supplies a correction control signal to the power control circuit 10, and adjusts the input power through the AC exciting device 6 and the double fed synchronous generator motor 1. The guide vane opening setting unit 17 sets the guide vane opening so that the maximum efficiency is obtained with respect to the power instruction value, and the optimum guide vane opening is corrected by a pump head setting unit 25 because the optimum guide vane opening varies in accordance with the pump head. The optimum guide vane opening signal from the guide vane opening setting unit 17 controls the guide vane opening of the reversible pump-turbine 2 to the optimum value by the servo motor 14 and the guide vane opening detector 15. The system frequency detected by the system frequency detector 18 and the reference frequency from the reference frequency setting unit 19 are taken into the power control circuit 10, the control signal obtained by adding the speed dropping rate characteristic to the deviation between the power instruction value and the actual power is supplied to the AC exciting device 6, and the double fed synchronous generator motor 1 automatically takes an input suitable for the state of the power system 5. For example, if the system frequency is lowered due to the load variation of the system during stable pumping operation, for example, the double fed synchronous generator motor 1 automatically reduces the input and contributes to restoration of the system frequency.

Figure 14:
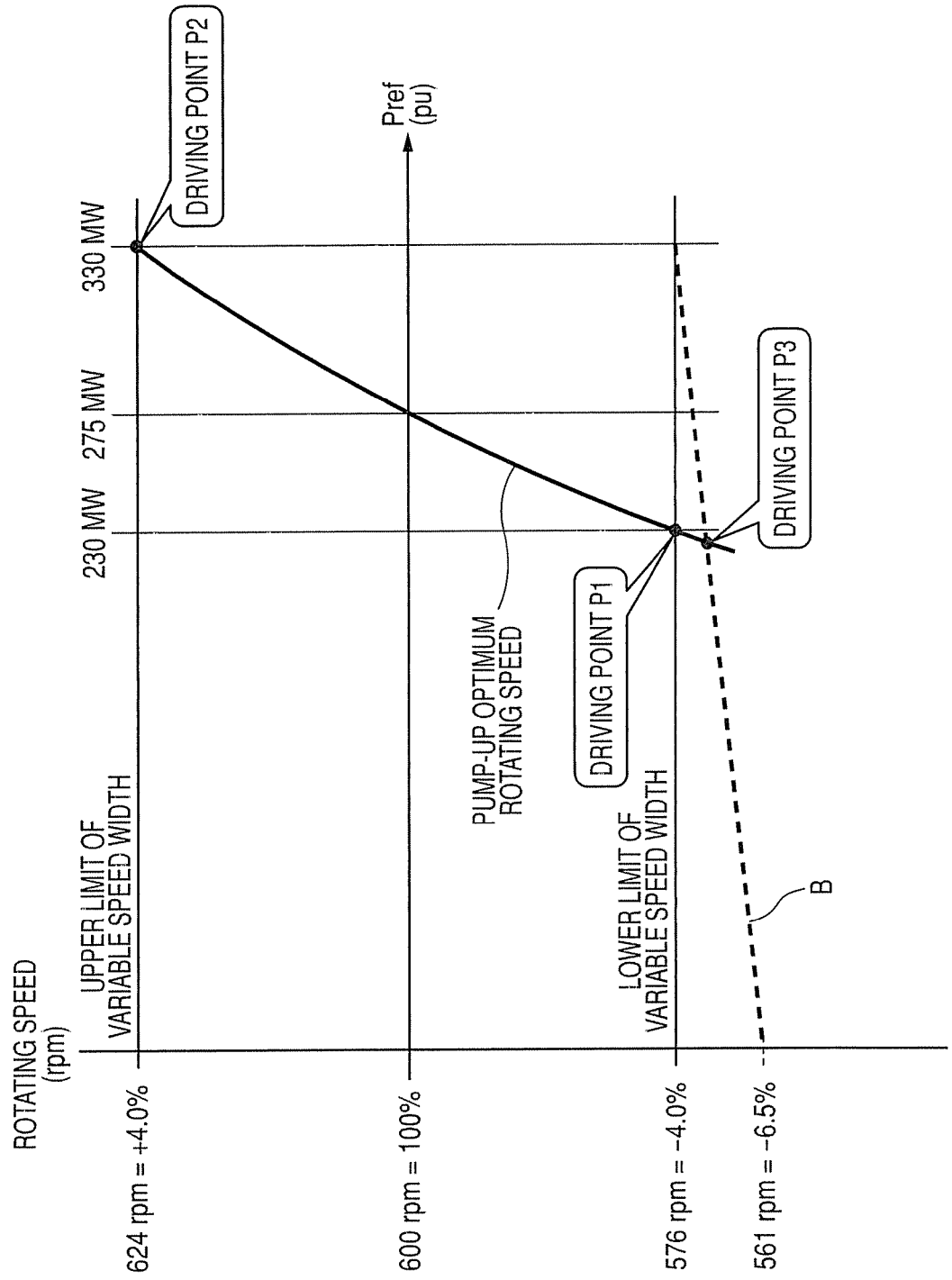
FIG. 14 is a diagram showing an example of the operation of the ninth embodiment according to the present invention.

Next, the operation will be described with reference to FIG. 14. The schematic specification concerning the pumping operation of the variable speed pumped-storage power generating system using the double fed synchronous generator motor 1 shown in FIG. 14 is set to the synchronous speed of 600 rpm, the variable speed width ±4%=±24 rpm, the maximum input of 330 MW and the lowest input of 230 MW, and thus the AFC capacity is assumed as 100 MW. The pump input is generally proportional to the three powers of the gross rotating speed and thus the relationship of the pump input and the rotating speed behaves like the pumping optimum rotating speed.

Under normal operation, when the power instruction value is supplied from a power supply instruction place through the power instruction value setting unit 11 in FIG. 14, the power control circuit 10 controls the AC exciting device 6 so that the deviation from the actual input signal from the power converter 8 is equal to zero, and the input is equal to the instruction value. When the rotating speed is deviated from the pumping lowest rotating speed due to some reason containing a design error, the rotating speed control circuit 24 corrects the power control instruction to perform the operation so that the rotating speed is not deviated from the optimum rotating speed.

Normally, the power instruction value from the power supply instruction place is given on the basis of the judgment of the status of the system, however, it is given so that the pumping optimum rotating speed of FIG. 14 does not exceed the upper and lower limits of the variable speed width. However, when the rotating speed is about to deviate from the upper and lower limits of the variable speed width due to variation of the pump head or the like, the variable speed width deviation preventing function equipped in the power control circuit 10 of FIG. 13 acts to prevent occurrence of the deviation in advance.

As indicated in the equation (2), the exciting voltage Vex required for the pumping operation is proportional to the product of the exciting current and the impedance of the rotor during the pumping operation. At the maximum input time, the maximum exciting current is required, and the frequency of the rotor at that time (called as the slip frequency) is also maximum, so that the impedance of the rotor is maximum. Accordingly, the exciting voltage at this time is maximum, and it determines the rated voltage Vr of the AC exciting device 6.

Irrespective of the pumping input, the variable speed width is generally determined by the constant rotor frequency, that is, the rotating speed which does not exceed the rated voltage Vr of the AC exciting current 6. It is found from FIG. 14 that at the driving point P1 the rotor frequency is maximum when the rotating speed is equal to the lower limit of the variable speed width, however, the exciting current is smaller than that at the driving point P2 because the pumping input is small. Accordingly, in the area where the pumping input instruction value is low, even when the variable speed width is enlarged as in the case of the driving point P3 of the new variable speed width lower limit curve B in FIG. 14, the operation can be performed with in the range of the rated voltage of the AC exciting device 6.

By making it possible to perform the operation as described above, the following three improvements can be implemented.

1. The AC capacity is increased by enlarging the lower limit side input of the pumping AFC width, and thus this can contribute to stabilization of the system.

2. When the pumping operation is started by a thyristor start device, the rotating speed to be accelerated can be lowered, and thus the capacity of the thyristor start device can be reduced.

3. When the pumping operation is stopped, the input can be narrowed down by reducing the rotating speed, and thus the breaking current of a parallel breaker is reduced. Therefore, this can contribute to extension of the lifetime of the contact point.

Tenth Embodiment

In the ninth embodiment, the variable speed width lower limit curve is set on the basis of the power instruction value, and it is based on the assumption that the double fed synchronous generator motor 1 operates the rated reactive power by large excitation current.

Figure 15:
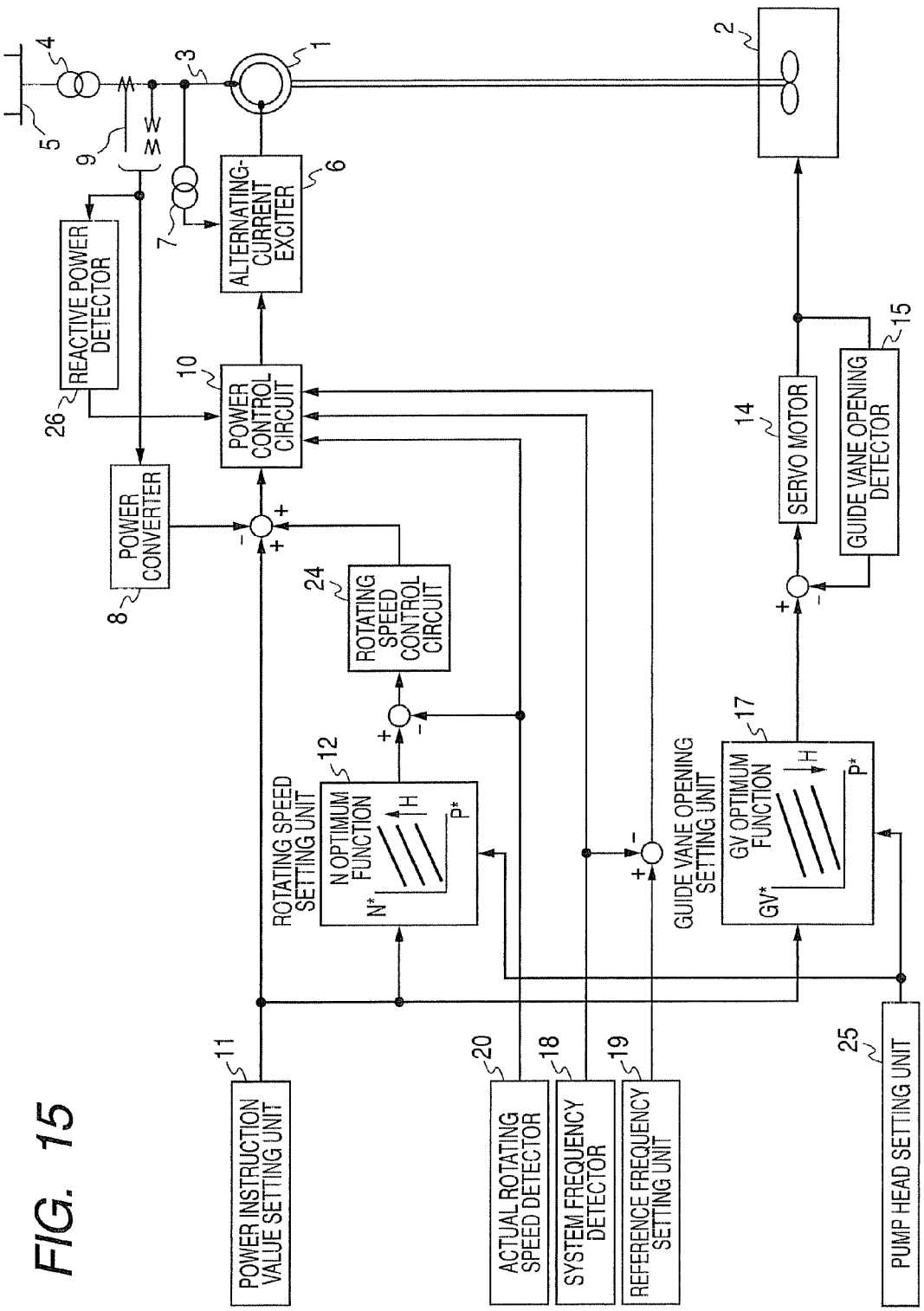
FIG. 15 is a control block diagram showing a tenth embodiment of the present invention.

The tenth embodiment is equipped with a reactive power detector 26 as shown in FIG. 15, and the exciting current may be set to a small value when the reactive power by large excitation current is equal to a small value below the rated value. Therefore, the tenth embodiment provides a control system of correcting the variable speed width lower limit so that the variable speed width is further enlarged by the amount corresponding to the reduction of the exciting current, thereby enlarging the minimum rotating speed under the low input.

Figure 16:
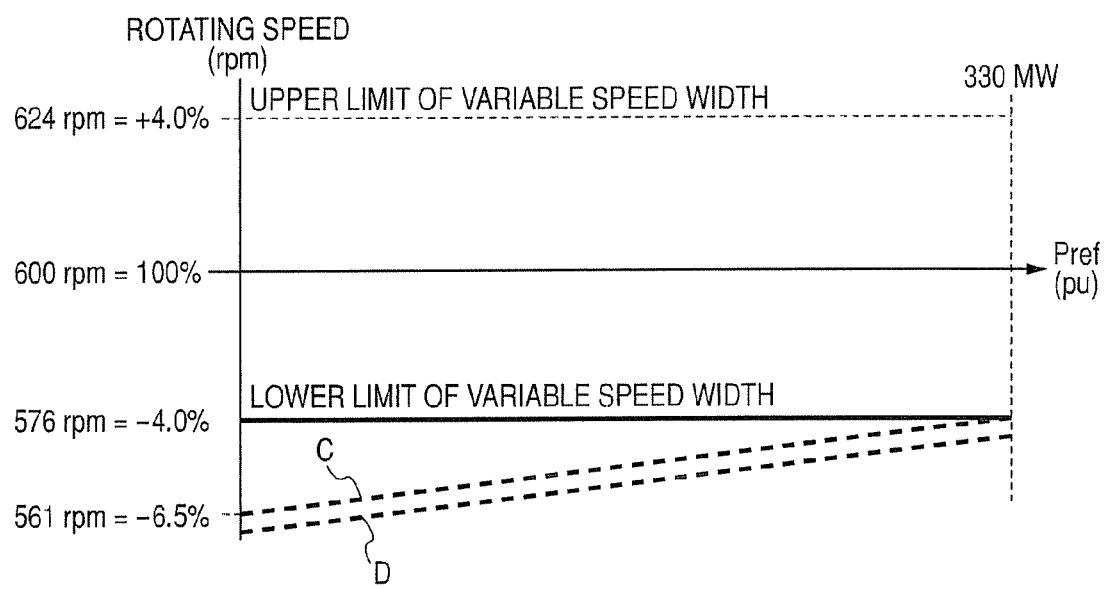
FIG. 16 is a diagram showing an example of the operation of the tenth embodiment according to the present invention.

FIG. 16 shows a specific example when the actual reactive power by large excitation current Qact is equal to the rated reactive power by large excitation current Qrate, a new variable speed width lower limit curve C is obtained, and it is not different from the new variable speed width lower limit curve B in the case of the ninth embodiment. However, when the actual reactive power by large excitation current Qact is below the rated value, the new optimum rotating speed is corrected to be reduced in proportion to the difference therebetween, and when the actual reactive power by large excitation current Qact is equal to zero, the new optimum rotating speed is corrected like a new variable speed width lower limit curve D, thereby enlarging the minimum rotating speed at the low input time.

Eleventh Embodiment

In the ninth embodiment, the variable speed width lower limit is set on the basis of the power instruction value, and it is based on the assumption that the double fed synchronous generator motor 1 operates at the rated lagging power factor.

Figure 17:
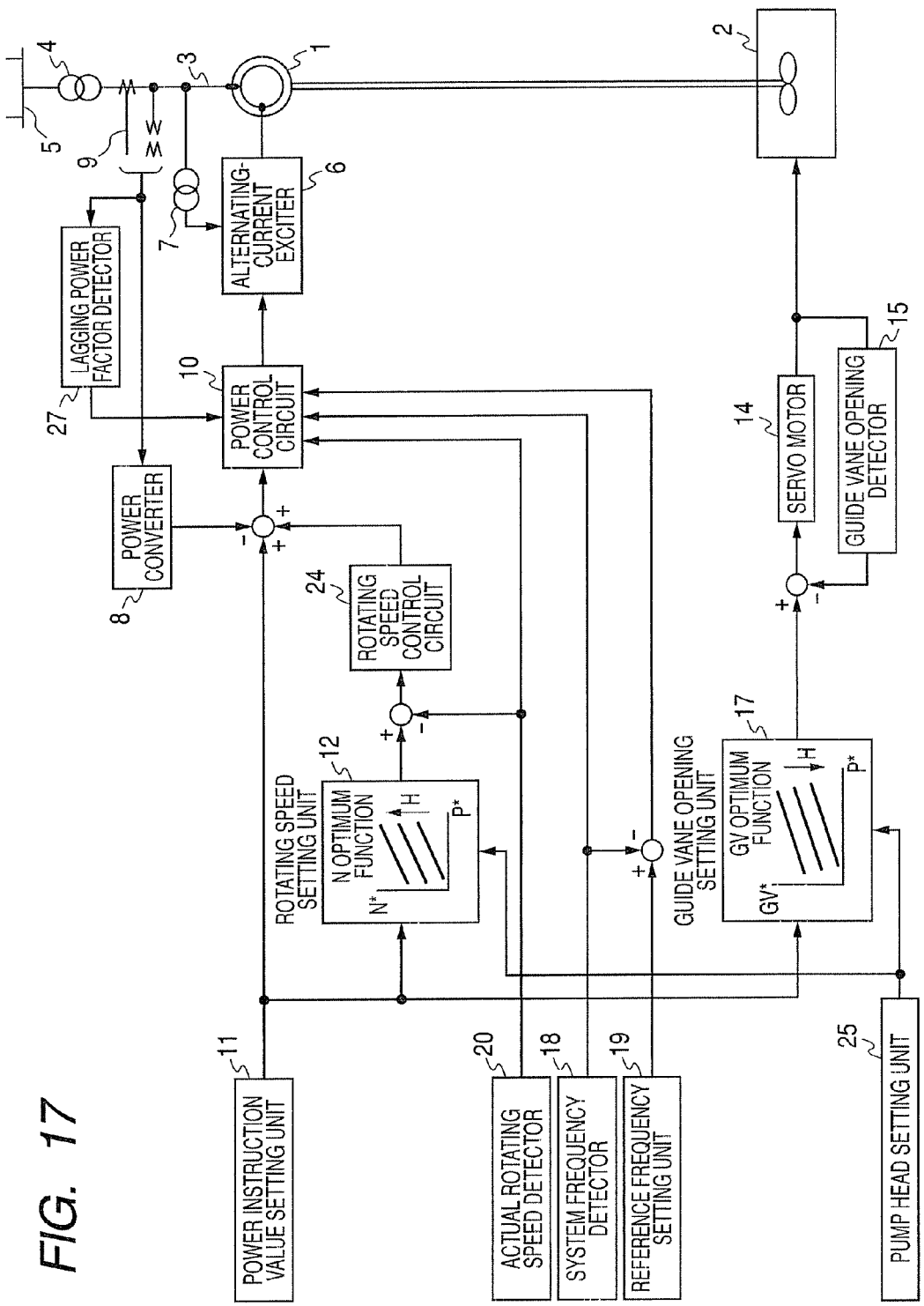
FIG. 17 is a control block diagram showing an eleventh embodiment according to the present invention.

The eleventh embodiment is provided with a lagging power factor detector 27 as shown in FIG. 17, and when the lagging power factor is near to 1, the exciting current may be set to a small value. Therefore, the eleventh embodiment provides a control system for correcting the variable speed so that the variable speed width is further enlarged by the amount corresponding to the reduction of the exciting current, thereby enhancing the power generation efficiency under a partial load.

Figure 18:
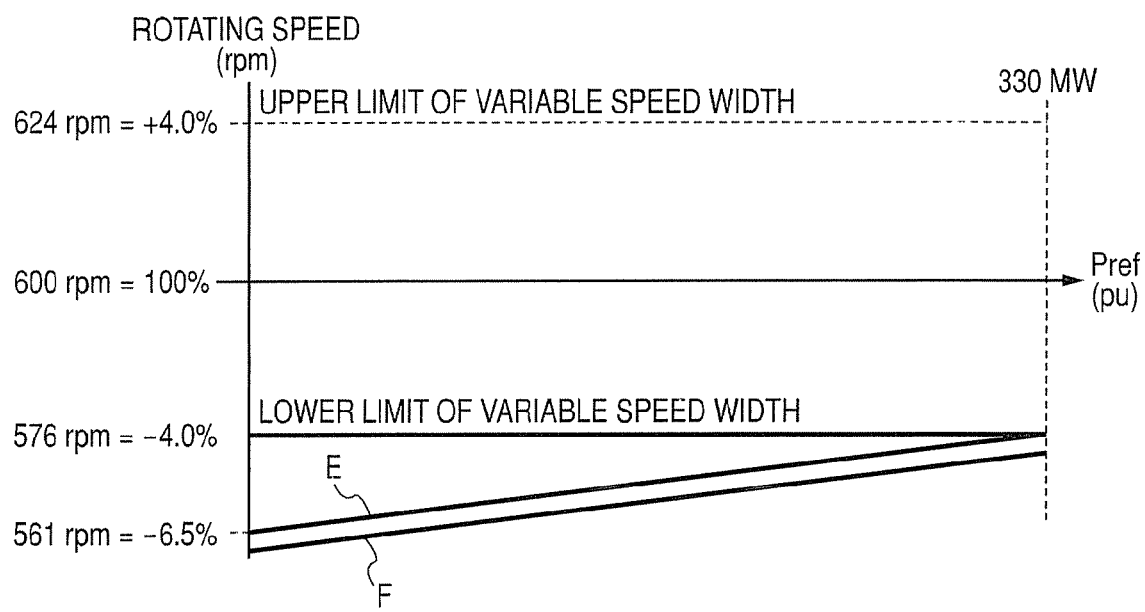
FIG. 18 is a diagram showing an example of the operation of the eleventh embodiment according to the present invention.

FIG. 18 shows a specific example when the actual lagging power factor Pfact is equal to the rated lagging power factor Pfrate, a new variable speed width lower limit curve E is obtained, and it is not different from the variable speed width lower limit curve B in the case of the ninth embodiment. However, when the actual lagging power factor Pfact is near to 1, the variable speed width lower limit curve is corrected to be reduced in accordance with the difference between the actual lagging power factor Pfact and the rated lagging power factor, and when the actual lagging power factor Pfact is equal to 1, it is corrected like a new variable speed width lower limit curve F, thereby enlarging the minimum rotating speed at the low input time.

Twelfth Embodiment

Figure 19:
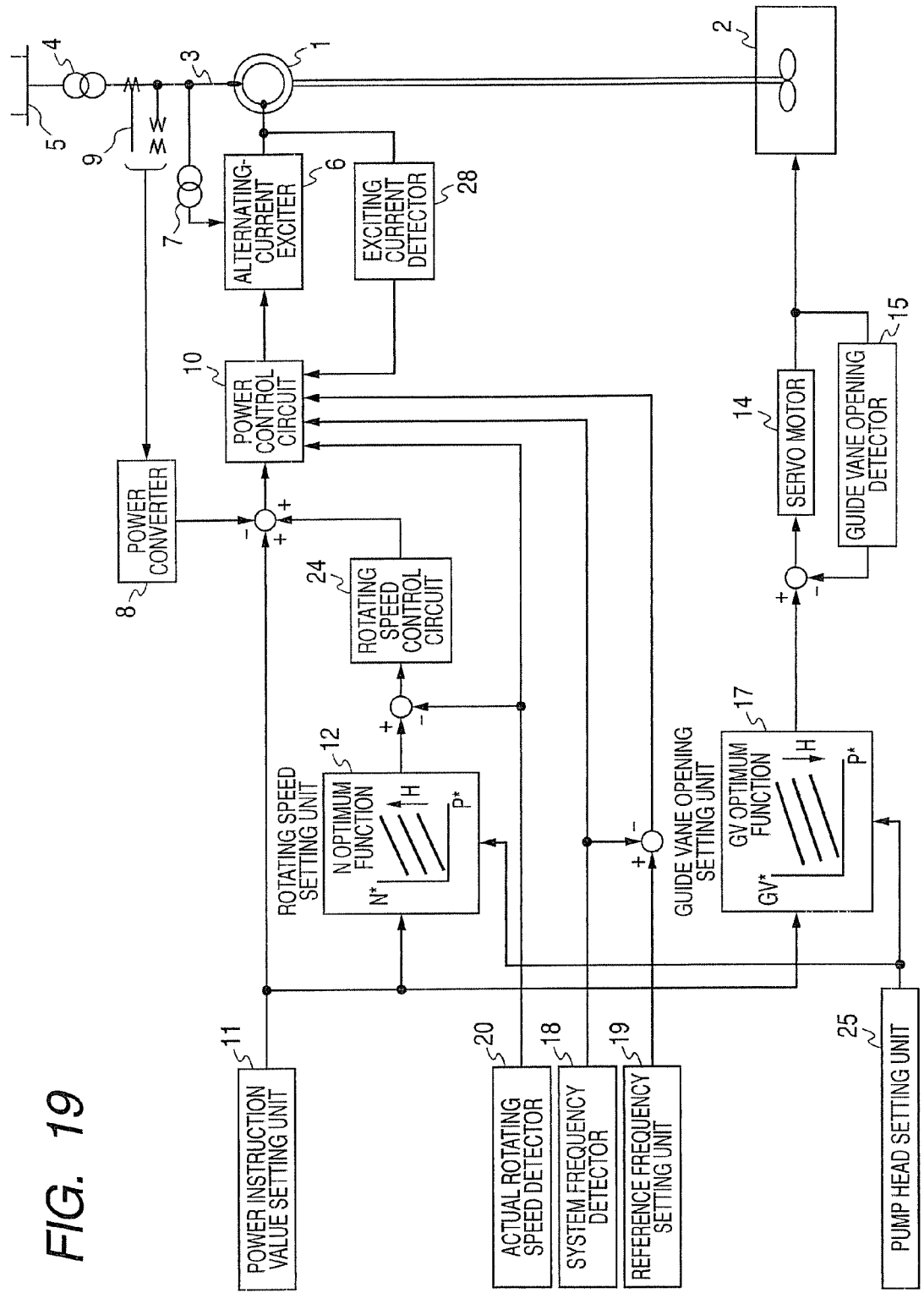
FIG. 19 is a control block diagram showing a twelfth embodiment of the present invention.

In the ninth embodiment, the variable speed width lower limit curve is set on the basis of the power instruction value. As shown in FIG. 19, the ninth embodiment is equipped with an exciting current detector 28 and provides a control system for setting a variable speed width lower limit curve on the basis of the system frequency and the exciting current, thereby enlarging the minimum rotating speed at the lower input time.

Figure 20:
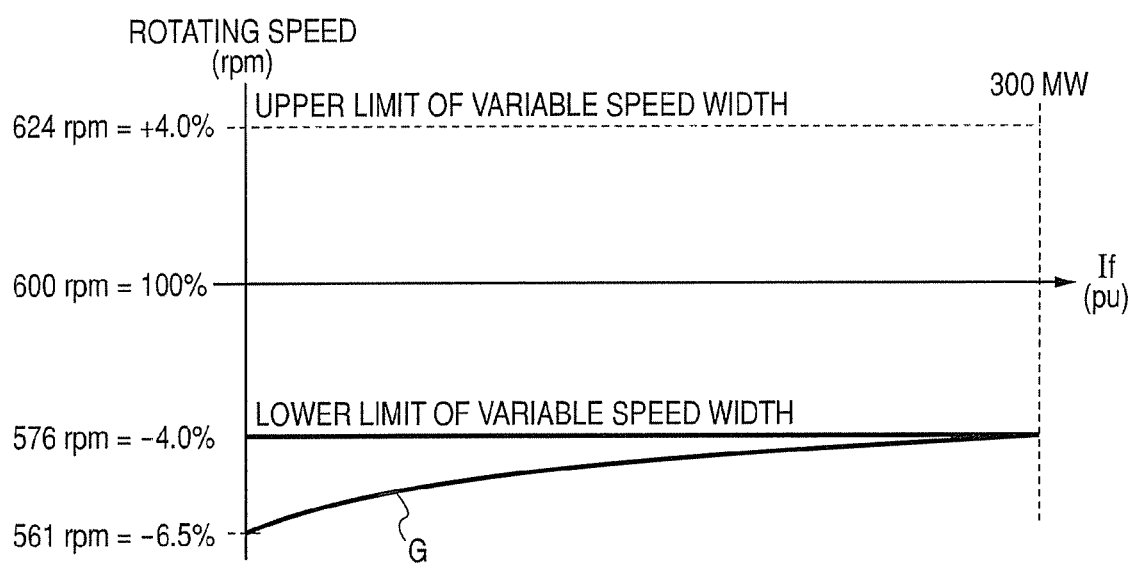
FIG. 20 is a diagram showing an example of the operation of the twelfth embodiment according to the present invention.

From the equations (1), (2) and (3), it is found that the rotating speed during pumping operation is restricted by the constant of the equipment and the exciting current and the system frequency during operation. As in the case of the fourth embodiment under power generating operation, the equation (8) is obtained by deforming the equations. The equation (8) provides a new variable speed lower limit curve G of FIG. 20.

Various modifications and alterations of this invention will be apparent from those skilled in the art without departing from the scope and spirit of this invention, and it should be understood that this is not limited to the illustrative embodiments set forth herein.

What is claimed is:

1. A double fed synchronous generator motor which is coupled to a reversible pump-turbine and operated while switched to a power generating operation mode or a pumping operation mode, comprising a controller for controlling the double fed synchronous generator motor so that power output from the double fed synchronous generator motor is coincident with an instruction value and the rotating speed is set between upper and lower limit values of the rotating speed by changing exciting current, wherein in the power generating operation mode, the lower limit value of the rotating speed is varied by active power output from the double fed synchronous generator motor, and when the active power is small, the lower limit value of the rotating speed is set to a smaller value than that when the active power is large.

2. The double fed synchronous generator motor according to claim 1, wherein in the power generating operation mode, the lower limit value of the rotating speed is varied on the basis of reactive power by large excitation current output from the double fed synchronous generator motor, and when the reactive power by large excitation current is small, the lower limit value of the rotating speed is set to a value smaller than that when the reactive power by large excitation current is large.

3. The double fed synchronous generator motor according to claim 1, wherein in the power generating operation mode, the lower limit value of the rotating speed is varied on the basis of a lagging power factor of power output from the double fed synchronous generator motor, and when the lagging power factor is large, the lower limit value of the rotating speed is set to a value smaller than that when the lagging power factor is small.

4. The double fed synchronous generator motor according to claim 1, wherein in the power generating operation mode, the lower limit value of the rotating speed is varied on the basis of exciting current, and when the exciting current is small, the lower limit value of the rotating speed is set to a value smaller than that when the exciting current is large.

5. The double fed synchronous generator motor according to claim 1, wherein the controller controls the rotating speed so that the rotating speed is coincident with the target value, and in the power generating operation mode, the target value is set to be larger than the lower limit value of the rotating speed by only a predetermined value.

6. The double fed synchronous generator motor according to claim 1, wherein in a pumping operation mode, the lower limit value of the rotating speed is varied on the basis of active power input to the double fed synchronous generator motor, and when the active power is small, the lower limit value of the rotating speed is set to a value smaller than that when the active power is large.

7. The double fed synchronous generator motor according to claim 6, wherein in the pumping operation mode, the lower limit value of the rotating speed is varied on the basis of reactive power by large excitation current input to the double fed synchronous generator motor, and when the reactive power by large excitation current is small, the lower limit value of the rotating speed is set to a value smaller than that when the reactive power by large excitation current is large.

8. The double fed synchronous generator motor according to claim 6, wherein in the pumping operation mode, the lower limit value of the rotating speed is varied on the basis of a lagging power factor of power input to the double fed synchronous generator motor, and when the lagging power factor is large, the lower limit value of the rotating speed is set to a value smaller than that when the lagging power factor is small.

9. The double fed synchronous generator motor according to claim 6, herein in the pumping operation mode, the lower limit value of the rotating speed is varied on the basis of exciting current, and when the exciting current is small, the lower limit value of the rotating speed is set to a value smaller than that when the exciting current is large.

* * * * *